US011157997B2

(12) United States Patent
Robida et al.

(10) Patent No.: US 11,157,997 B2
(45) Date of Patent: *Oct. 26, 2021

(54) SYSTEMS AND METHODS FOR ANALYZING DATA

(71) Applicant: Experian Information Solutions, Inc., Costa Mesa, CA (US)

(72) Inventors: Chuck Robida, Roswell, GA (US); Chien-Wei Wang, Irvine, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/962,933

(22) Filed: Apr. 25, 2018

(65) Prior Publication Data
US 2019/0102832 A1    Apr. 4, 2019

Related U.S. Application Data

(60) Division of application No. 13/555,982, filed on Jul. 23, 2012, now abandoned, which is a continuation of
(Continued)

(51) Int. Cl.
*G06Q 40/02* (2012.01)
*G06Q 20/10* (2012.01)
(Continued)

(52) U.S. Cl.
CPC .......... *G06Q 40/02* (2013.01); *G06Q 20/10* (2013.01); *G06Q 30/0204* (2013.01);
(Continued)

(58) Field of Classification Search
CPC .... G06Q 40/02; G06Q 20/10; G06Q 30/0204; G06Q 40/00; G06Q 40/025; G06Q 40/04; G06Q 40/06; G06Q 40/08
See application file for complete search history.

(56) References Cited

U.S. PATENT DOCUMENTS 3,316,395 A    4/1967    Lavin et al.
4,305,059 A    12/1981   Benton
(Continued)

FOREIGN PATENT DOCUMENTS

CA    2 611 595    12/2006
CN    1290373    4/2001
(Continued)

OTHER PUBLICATIONS

Agarwal, S., & Liu, C. (2003). Determinants of credit card delinquency and bankruptcy: Macroeconomic factors. Journal of Economics and Finance, 27(1), 75-84. Retrieved from https://dialog.proquest.com/professional/docview/215589330?accountid=131444 on Jun. 11, 2021 (Year: 2003).*
(Continued)

*Primary Examiner* — Kito R Robinson
(74) *Attorney, Agent, or Firm* — Knobbe, Martens, Olson & Bear, LLP

(57) ABSTRACT

Information regarding individuals that fit a bad performance definition, such as individuals that have previously defaulted on a financial instrument or have declared bankruptcy, is used to develop a model that is usable to determine whether an individual that does not fit the bad performance definition is more likely to subsequently default on a financial instrument or to declare bankruptcy. The model may be used to generate a score for each individual, and the score may be used to segment the individual into a segment of a segmentation structure that includes individuals with related scores, where segments may include different models for generating a final risk score for the individuals assigned to the particular segments. The segment to which an individual is assigned, which may be determined based at least partly on the score assigned to the individual, may affect the final risk score that is assigned to the individual.

18 Claims, 16 Drawing Sheets

Related U.S. Application Data application No. 12/338,871, filed on Dec. 18, 2008, now abandoned, which is a division of application No. 11/535,907, filed on Sep. 27, 2006, now Pat. No. 7,711,636.

(60) Provisional application No. 60/781,391, filed on Mar. 10, 2006.

(51) Int. Cl.
    *G06Q 30/02*      (2012.01)
    *G06Q 40/00*      (2012.01)
    *G06Q 40/04*      (2012.01)
    *G06Q 40/06*      (2012.01)
    *G06Q 40/08*      (2012.01)

(52) U.S. Cl.
    CPC ........... *G06Q 40/00* (2013.01); *G06Q 40/025* (2013.01); *G06Q 40/04* (2013.01); *G06Q 40/06* (2013.01); *G06Q 40/08* (2013.01)

(56) References Cited

U.S. PATENT DOCUMENTS

| | | |
|---|---|---|
| 4,346,442 A | 8/1982 | Musmanno |
| 4,491,725 A | 1/1985 | Pritchard |
| 4,578,530 A | 3/1986 | Zeidler |
| 4,736,294 A | 4/1988 | Gill |
| 4,774,664 A | 9/1988 | Campbell et al. |
| 4,812,628 A | 3/1989 | Boston et al. |
| 4,872,113 A | 10/1989 | Dinerstein |
| 4,876,592 A | 10/1989 | Von Kohorn |
| 4,891,503 A | 1/1990 | Jewell |
| 4,895,518 A | 1/1990 | Arnold |
| 4,947,028 A | 8/1990 | Gorog |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,201,010 A | 4/1993 | Deaton et al. |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,301,105 A | 4/1994 | Cummings, Jr. |
| 5,317,636 A | 5/1994 | Vizcaino |
| 5,317,733 A | 5/1994 | Murdock |
| 5,336,870 A | 8/1994 | Hughes et al. |
| 5,361,201 A | 11/1994 | Jost et al. |
| 5,454,030 A | 9/1995 | de Oliveira et al. |
| 5,500,513 A | 3/1996 | Langhans et al. |
| 5,504,675 A | 4/1996 | Cragun et al. |
| 5,521,813 A | 5/1996 | Fox et al. |
| 5,557,514 A | 9/1996 | Seare et al. |
| 5,563,783 A | 10/1996 | Stolfo et al. |
| 5,583,760 A | 12/1996 | Klesse |
| 5,583,763 A | 12/1996 | Atcheson et al. |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,644,778 A | 7/1997 | Burks et al. |
| 5,649,114 A | 7/1997 | Deaton et al. |
| 5,659,725 A | 8/1997 | Levy et al. |
| 5,692,107 A | 11/1997 | Simoudis et al. |
| 5,696,907 A | 12/1997 | Tom |
| 5,699,527 A | 12/1997 | Davidson |
| 5,704,029 A | 12/1997 | Wright, Jr. |
| 5,704,044 A | 12/1997 | Tarter et al. |
| 5,708,422 A | 1/1998 | Blonder et al. |
| 5,732,400 A | 3/1998 | Mandler |
| 5,745,654 A | 4/1998 | Titan |
| 5,745,706 A | 4/1998 | Wolfberg et al. |
| 5,748,098 A | 5/1998 | Grace |
| 5,764,923 A | 6/1998 | Tallman et al. |
| 5,774,868 A | 6/1998 | Cragun et al. |
| 5,774,883 A | 6/1998 | Andersen |
| 5,793,972 A | 8/1998 | Shane |
| 5,802,142 A | 9/1998 | Browne |
| 5,819,226 A | 10/1998 | Gopinathan et al. |
| 5,822,410 A | 10/1998 | McCausland et al. |
| 5,832,447 A | 11/1998 | Rieker et al. |
| 5,844,218 A | 12/1998 | Kawan et al. |
| 5,857,174 A | 1/1999 | Dugan |
| 5,870,721 A | 2/1999 | Norris |
| 5,875,236 A | 2/1999 | Jankowitz |
| 5,878,403 A | 3/1999 | DeFrancesco |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,912,839 A | 6/1999 | Ovshinsky et al. |
| 5,914,472 A | 6/1999 | Foladare et al. |
| 5,918,217 A | 6/1999 | Maggioncalda et al. |
| 5,924,082 A | 7/1999 | Silverman et al. |
| 5,926,800 A | 7/1999 | Baronowski et al. |
| 5,930,759 A | 7/1999 | Moore et al. |
| 5,930,764 A | 7/1999 | Melchione et al. |
| 5,930,776 A | 7/1999 | Dykstra et al. |
| 5,933,809 A | 8/1999 | Hunt et al. |
| 5,933,813 A | 8/1999 | Teicher et al. |
| 5,940,812 A | 8/1999 | Tengel et al. |
| 5,950,172 A | 9/1999 | Klingman |
| 5,950,179 A | 9/1999 | Buchanan et al. |
| 5,953,707 A | 9/1999 | Huang et al. |
| 5,953,710 A | 9/1999 | Fleming |
| 5,956,693 A | 9/1999 | Geerlings |
| 5,966,695 A | 10/1999 | Melchione et al. |
| 5,966,699 A | 10/1999 | Zandi |
| 5,970,478 A | 10/1999 | Walker et al. |
| 5,978,780 A | 11/1999 | Watson |
| 5,991,411 A | 11/1999 | Kaufman et al. |
| 5,995,947 A | 11/1999 | Fraser et al. |
| 5,999,596 A | 12/1999 | Walker et al. |
| 6,012,044 A | 1/2000 | Maggioncalda et al. |
| 6,014,632 A | 1/2000 | Gamble et al. |
| 6,014,645 A | 1/2000 | Cunningham |
| 6,018,723 A | 1/2000 | Siegel et al. |
| 6,021,397 A | 2/2000 | Jones et al. |
| 6,021,943 A | 2/2000 | Chastain |
| 6,029,139 A | 2/2000 | Cunningham et al. |
| 6,029,149 A | 2/2000 | Dykstra et al. |
| 6,029,178 A | 2/2000 | Martin et al. |
| 6,038,551 A | 3/2000 | Barlow et al. |
| 6,044,351 A | 3/2000 | Jones |
| 6,044,352 A | 3/2000 | Deavers |
| 6,044,357 A | 3/2000 | Garg |
| 6,055,570 A | 4/2000 | Nielsen |
| 6,064,987 A | 5/2000 | Walker |
| 6,064,990 A | 5/2000 | Goldsmith |
| 6,067,522 A | 5/2000 | Warady et al. |
| 6,070,141 A | 5/2000 | Houvener |
| 6,070,147 A | 5/2000 | Harms et al. |
| 6,072,894 A | 6/2000 | Payne |
| 6,073,104 A | 6/2000 | Field |
| 6,073,140 A | 6/2000 | Morgan et al. |
| 6,078,922 A | 6/2000 | Johnson et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,108,641 A | 8/2000 | Kenna et al. |
| 6,115,690 A | 9/2000 | Wong |
| 6,115,694 A | 9/2000 | Cheetham et al. |
| 6,119,103 A | 9/2000 | Basch et al. |
| 6,128,599 A | 10/2000 | Walker |
| 6,128,602 A | 10/2000 | Northington et al. |
| 6,128,603 A | 10/2000 | Dent |
| 6,129,273 A | 10/2000 | Shah |
| 6,144,948 A | 11/2000 | Walker et al. |

(56) References Cited

U.S. PATENT DOCUMENTS

| | | |
|---|---|---|
| 6,154,729 A | 11/2000 | Cannon et al. |
| 6,163,770 A | 12/2000 | Gamble et al. |
| 6,171,112 B1 | 1/2001 | Clark et al. |
| 6,182,229 B1 | 1/2001 | Nielsen |
| 6,185,543 B1 | 2/2001 | Galperin et al. |
| 6,199,077 B1 | 3/2001 | Inala et al. |
| 6,202,053 B1 | 3/2001 | Christiansen et al. |
| 6,208,973 B1 | 3/2001 | Boyer et al. |
| 6,208,979 B1 | 3/2001 | Sinclair |
| 6,233,566 B1 | 5/2001 | Levine et al. |
| 6,236,977 B1 | 5/2001 | Verba et al. |
| 6,249,770 B1 | 6/2001 | Erwin et al. |
| 6,253,203 B1 | 6/2001 | O'Flaherty et al. |
| 6,269,325 B1 | 7/2001 | Lee et al. |
| 6,275,824 B1 | 8/2001 | O'Flaherty et al. |
| 6,285,987 B1 | 9/2001 | Roth et al. |
| 6,298,348 B1 | 10/2001 | Eldering |
| 6,304,860 B1 | 10/2001 | Martin et al. |
| 6,311,169 B2 | 10/2001 | Duhon |
| 6,317,783 B1 | 11/2001 | Freishtat et al. |
| 6,321,205 B1 | 11/2001 | Eder |
| 6,324,524 B1 | 11/2001 | Lent et al. |
| 6,327,578 B1 | 12/2001 | Linehan |
| 6,330,546 B1 | 12/2001 | Gopinathan et al. |
| 6,330,575 B1 | 12/2001 | Moore et al. |
| 6,339,790 B1 | 1/2002 | Inoue |
| 6,374,229 B1 | 4/2002 | Lowrey et al. |
| 6,374,230 B1 | 4/2002 | Walker et al. |
| 6,374,264 B1 | 4/2002 | Bohannon et al. |
| 6,384,844 B1 | 5/2002 | Stewart et al. |
| 6,385,594 B1 | 5/2002 | Lebda et al. |
| 6,386,444 B1 | 5/2002 | Sullivan |
| 6,393,406 B1 | 5/2002 | Eder |
| 6,397,224 B1 | 5/2002 | Zubeldia et al. |
| 6,405,173 B1 | 6/2002 | Honarvar |
| 6,405,181 B2 | 6/2002 | Lent et al. |
| 6,422,462 B1 | 7/2002 | Cohen |
| 6,424,956 B1 | 7/2002 | Werbos |
| 6,430,539 B1 | 8/2002 | Lazarus et al. |
| 6,453,297 B1 | 9/2002 | Burks et al. |
| 6,456,979 B1 | 9/2002 | Flagg |
| 6,456,983 B1 | 9/2002 | Keyes et al. |
| 6,487,540 B1 | 11/2002 | Smith et al. |
| 6,513,018 B1 | 1/2003 | Culhane |
| 6,529,880 B1 | 3/2003 | McKeen et al. |
| 6,532,450 B1 | 3/2003 | Brown et al. |
| 6,542,894 B1 | 4/2003 | Lee et al. |
| 6,567,791 B2 | 5/2003 | Lent et al. |
| 6,581,075 B1 | 6/2003 | Guturu et al. |
| 6,587,841 B1 | 7/2003 | DeFrancesco |
| 6,597,775 B2 | 7/2003 | Lawyer et al. |
| 6,598,030 B1 | 7/2003 | Siegel et al. |
| 6,611,816 B2 | 8/2003 | Lebda et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,636,803 B1 | 10/2003 | Hartz, Jr. et al. |
| 6,640,215 B1 | 10/2003 | Galperin et al. |
| 6,658,393 B1 | 12/2003 | Basch et al. |
| 6,684,093 B2 | 1/2004 | Kuth |
| 6,745,938 B2 | 6/2004 | Sullivan |
| 6,748,426 B1 | 6/2004 | Shaffer et al. |
| 6,782,390 B2 | 8/2004 | Lee et al. |
| 6,804,346 B1 | 10/2004 | Mewhinney |
| 6,805,287 B2 | 10/2004 | Bishop et al. |
| 6,823,319 B1 | 11/2004 | Lynch et al. |
| 6,826,535 B2 | 11/2004 | Wood et al. |
| 6,832,229 B2 | 12/2004 | Reed |
| 6,836,764 B1 | 12/2004 | Hucal |
| 6,839,682 B1 | 1/2005 | Blume et al. |
| 6,839,690 B1 | 1/2005 | Foth et al. |
| 6,842,782 B1 | 1/2005 | Malik et al. |
| 6,847,942 B1 | 1/2005 | Land et al. |
| 6,850,606 B2 | 2/2005 | Lawyer et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,912,483 B2 | 6/2005 | Frederick |
| 6,950,807 B2 | 9/2005 | Brock |
| 6,959,281 B1 | 10/2005 | Freeling et al. |
| 6,962,336 B2 | 11/2005 | Glass |
| 6,985,887 B1 | 1/2006 | Sunstein et al. |
| 6,988,085 B2 | 1/2006 | Hedy |
| 7,003,476 B1 | 2/2006 | Samra et al. |
| 7,003,491 B2 | 2/2006 | Starkman |
| 7,013,310 B2 | 3/2006 | Messing et al. |
| 7,016,870 B1 | 3/2006 | Jones et al. |
| 7,028,052 B2 | 4/2006 | Chapman et al. |
| 7,058,817 B1 | 6/2006 | Ellmore |
| 7,059,531 B2 | 6/2006 | Beenau et al. |
| 7,062,458 B2 | 6/2006 | Maggioncalda et al. |
| 7,065,566 B2 | 6/2006 | Menard et al. |
| 7,069,249 B2 | 6/2006 | Stolfo et al. |
| 7,072,842 B2 | 7/2006 | Provost et al. |
| 7,076,462 B1 | 7/2006 | Nelson et al. |
| 7,076,475 B2 | 7/2006 | Honarvar et al. |
| 7,083,087 B1 | 8/2006 | Gangi |
| 7,120,599 B2 | 10/2006 | Keyes |
| 7,121,471 B2 | 10/2006 | Beenau et al. |
| 7,133,840 B1 | 11/2006 | Kenna et al. |
| 7,143,063 B2 | 11/2006 | Lent |
| 7,154,375 B2 | 12/2006 | Beenau et al. |
| 7,165,037 B2 | 1/2007 | Lazarus et al. |
| 7,171,371 B2 | 1/2007 | Goldstein |
| 7,174,302 B2 | 2/2007 | Patricelli et al. |
| 7,181,427 B1 | 2/2007 | Defrancesco |
| 7,191,150 B1 | 3/2007 | Shao et al. |
| 7,191,451 B2 | 3/2007 | Nakagawa |
| 7,197,468 B1 | 3/2007 | Patricelli et al. |
| 7,213,064 B2 | 5/2007 | Smith et al. |
| 7,229,006 B2 | 6/2007 | Babbi et al. |
| 7,240,059 B2 | 7/2007 | Bayliss et al. |
| 7,243,075 B1 | 7/2007 | Shaffer et al. |
| 7,246,068 B2 | 7/2007 | Thomas, Jr. |
| 7,249,076 B1 | 7/2007 | Pendleton et al. |
| 7,254,558 B2 | 8/2007 | Hinkle et al. |
| 7,263,497 B1 | 8/2007 | Wiser et al. |
| 7,275,083 B1 | 9/2007 | Seibel et al. |
| 7,277,869 B2 | 10/2007 | Starkman |
| 7,280,980 B1 | 10/2007 | Hoadley et al. |
| 7,280,983 B2 | 10/2007 | Kuroda et al. |
| 7,295,988 B1 | 11/2007 | Reeves |
| 7,296,734 B2 | 11/2007 | Pliha |
| 7,298,872 B2 | 11/2007 | Glisson |
| 7,302,420 B2 | 11/2007 | Aggarwal et al. |
| 7,303,120 B2 | 12/2007 | Beenau et al. |
| 7,305,359 B2 | 12/2007 | Bonnell |
| 7,308,417 B1 | 12/2007 | Nathan |
| 7,310,617 B1 | 12/2007 | Cunningham |
| 7,314,166 B2 | 1/2008 | Anderson et al. |
| 7,318,224 B2 | 1/2008 | Honarvar et al. |
| 7,328,276 B2 | 2/2008 | Alisuag |
| 7,330,835 B2 | 2/2008 | Deggendorf |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,340,424 B2 | 3/2008 | Gang et al. |
| 7,340,434 B2 | 3/2008 | Schnall |
| 7,346,576 B2 | 3/2008 | Lent et al. |
| 7,366,694 B2 | 4/2008 | Lazerson |
| 7,376,603 B1 | 5/2008 | Mayr et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,227 B2 | 6/2008 | Weinflash et al. |
| 7,383,988 B2 | 6/2008 | Slonecker, Jr. |
| 7,386,466 B2 | 6/2008 | McLean et al. |
| 7,392,203 B2 | 6/2008 | Edison et al. |
| 7,392,216 B1 | 6/2008 | Palmgren et al. |
| 7,392,221 B2 | 6/2008 | Nabe et al. |
| 7,395,232 B1 | 7/2008 | Pilato |
| 7,403,919 B2 | 7/2008 | Chacko et al. |

(56) References Cited

U.S. PATENT DOCUMENTS

| | | |
|---|---|---|
| 7,409,369 B1 | 8/2008 | Homuth et al. |
| 7,418,417 B2 | 8/2008 | Chacko et al. |
| 7,428,509 B2 | 9/2008 | Klebanoff |
| 7,433,855 B2 | 10/2008 | Gavan et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,472,088 B2 | 12/2008 | Taylor et al. |
| 7,479,949 B2 | 1/2009 | Jobs et al. |
| 7,480,631 B1 | 1/2009 | Merced et al. |
| 7,505,939 B2 | 3/2009 | Lent et al. |
| 7,527,967 B2 | 5/2009 | Chao et al. |
| 7,529,698 B2 | 5/2009 | Joao |
| 7,536,329 B2 | 5/2009 | Goldberg et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,552,086 B1 | 6/2009 | Rajasekar et al. |
| 7,556,192 B2 | 7/2009 | Wokaty, Jr. |
| 7,559,217 B2 | 7/2009 | Bass |
| 7,562,184 B2 | 7/2009 | Henmi et al. |
| 7,571,139 B1 | 8/2009 | Giordano et al. |
| 7,580,856 B1 | 8/2009 | Pliha |
| 7,580,884 B2 | 8/2009 | Cook |
| 7,584,146 B1 | 9/2009 | Duhon |
| 7,590,589 B2 | 9/2009 | Hoffberg |
| 7,593,889 B2 | 9/2009 | Raines et al. |
| 7,593,891 B2 | 9/2009 | Kornegay et al. |
| 7,593,892 B2 | 9/2009 | Balk et al. |
| 7,593,893 B1 | 9/2009 | Ladd et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,610,229 B1 | 10/2009 | Kornegay |
| 7,610,257 B1 | 10/2009 | Abrahams |
| 7,617,116 B2 | 11/2009 | Amar et al. |
| 7,620,592 B2 | 11/2009 | O'Mara et al. |
| 7,624,068 B1 | 11/2009 | Heasley et al. |
| 7,630,932 B2 | 12/2009 | Danaher et al. |
| 7,630,933 B2 | 12/2009 | Peterson et al. |
| 7,653,592 B1 | 1/2010 | Flaxman et al. |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,418 B1 | 3/2010 | Chung et al. |
| 7,686,214 B1 | 3/2010 | Shao et al. |
| 7,689,451 B2 | 3/2010 | Vives |
| 7,689,494 B2 | 3/2010 | Torre et al. |
| 7,689,505 B2 | 3/2010 | Kasower |
| 7,689,506 B2 | 3/2010 | Fei et al. |
| 7,698,214 B1 | 4/2010 | Lindgren |
| 7,707,102 B2 | 4/2010 | Rothstein |
| 7,708,196 B2 | 5/2010 | Palmieri et al. |
| 7,711,635 B2 | 5/2010 | Steele et al. |
| 7,711,636 B2 | 5/2010 | Robida et al. |
| 7,720,750 B2 | 5/2010 | Brody |
| 7,729,983 B1 | 6/2010 | Ellis |
| 7,734,522 B2 | 6/2010 | Johnson et al. |
| 7,747,559 B2 | 6/2010 | Leitner et al. |
| 7,756,789 B2 | 7/2010 | Welker et al. |
| 7,761,379 B2 | 7/2010 | Zoldi et al. |
| 7,765,148 B2 | 7/2010 | German et al. |
| 7,769,657 B2 | 8/2010 | Chacko et al. |
| 7,774,257 B2 | 8/2010 | Maggioncalda et al. |
| 7,774,270 B1 | 8/2010 | MacCloskey |
| 7,783,562 B1 | 8/2010 | Ellis |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,716 B2 | 9/2010 | Gooding et al. |
| 7,792,732 B2 | 9/2010 | Haggerty et al. |
| 7,793,835 B1 | 9/2010 | Coggeshall et al. |
| 7,797,734 B2 | 9/2010 | Babi et al. |
| 7,801,812 B2 | 9/2010 | Conlin et al. |
| 7,805,345 B2 | 9/2010 | Abrahams et al. |
| 7,814,004 B2 | 10/2010 | Haggerty et al. |
| 7,814,005 B2 | 10/2010 | Lmrey et al. |
| 7,818,228 B1 | 10/2010 | Coulter |
| 7,818,229 B2 | 10/2010 | Imrey et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,849,004 B2 | 12/2010 | Choudhuri et al. |
| 7,853,518 B2 | 12/2010 | Cagan |
| 7,853,998 B2 | 12/2010 | Blaisdell et al. |
| 7,860,782 B2 | 12/2010 | Cash et al. |
| 7,860,786 B2 | 12/2010 | Blackburn et al. |
| 7,873,677 B2 | 1/2011 | Messing et al. |
| 7,877,304 B1 | 1/2011 | Coulter |
| 7,877,320 B1 | 1/2011 | Downey |
| 7,890,420 B2 | 2/2011 | Haggerty et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,770 B2 | 3/2011 | Haggerty et al. |
| 7,912,865 B2 | 3/2011 | Akerman et al. |
| 7,925,578 B1 | 4/2011 | Hong et al. |
| 7,925,582 B1 | 4/2011 | Kornegay et al. |
| 7,930,242 B2 | 4/2011 | Morris et al. |
| 7,930,252 B2 | 4/2011 | Bender et al. |
| 7,941,363 B2 | 5/2011 | Tanaka et al. |
| 7,941,365 B1 | 5/2011 | Bradley et al. |
| 7,945,510 B1 | 5/2011 | Bradley et al. |
| 7,949,597 B2 | 5/2011 | Zadoorian et al. |
| 7,953,213 B2 | 5/2011 | Babi et al. |
| 7,962,404 B1 | 6/2011 | Metzger, II et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,983,975 B2 | 7/2011 | Jones et al. |
| 7,983,976 B2 | 7/2011 | Nafeh et al. |
| 7,987,124 B1 | 7/2011 | Holden et al. |
| 7,991,689 B1 | 8/2011 | Brunzell et al. |
| 8,001,034 B2 | 8/2011 | Chung et al. |
| 8,001,041 B2 | 8/2011 | Hoadley et al. |
| 8,001,042 B1 | 8/2011 | Brunzell et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,107 B2 | 9/2011 | Kornegay et al. |
| 8,024,263 B2 | 9/2011 | Zarikian et al. |
| 8,024,778 B2 | 9/2011 | Cash et al. |
| 8,032,932 B2 | 10/2011 | Speyer et al. |
| 8,036,979 B1 | 10/2011 | Torrez et al. |
| 8,055,579 B2 | 11/2011 | Davies et al. |
| 8,060,424 B2 | 11/2011 | Kasower |
| 8,065,234 B2 | 11/2011 | Liao et al. |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,086,524 B1 | 12/2011 | Craig et al. |
| 8,095,458 B2 | 1/2012 | Peterson et al. |
| 8,099,356 B2 | 1/2012 | Feinstein et al. |
| 8,126,805 B2 | 2/2012 | Sulkowski et al. |
| 8,131,614 B2 | 3/2012 | Haggerty et al. |
| 8,160,960 B1 | 4/2012 | Fei et al. |
| 8,165,940 B2 | 4/2012 | Meimes et al. |
| 8,185,408 B2 | 5/2012 | Baldwin, Jr. et al. |
| 8,190,511 B2 | 5/2012 | Erickson |
| 8,195,549 B2 | 6/2012 | Kasower |
| 8,204,774 B2 | 6/2012 | Chwast et al. |
| 8,204,812 B2 | 6/2012 | Stewart et al. |
| 8,214,238 B1 | 7/2012 | Fairfield et al. |
| 8,225,395 B2 | 7/2012 | Atwood et al. |
| 8,234,498 B2 | 7/2012 | Britti et al. |
| 8,255,971 B1 | 8/2012 | Webb et al. |

(56) References Cited

U.S. PATENT DOCUMENTS

| | | |
|---|---|---|
| 8,260,699 B2 | 9/2012 | Smith et al. |
| 8,280,805 B1 | 10/2012 | Abrahams et al. |
| 8,285,613 B1 | 10/2012 | Coulter |
| 8,290,840 B2 | 10/2012 | Kasower |
| 8,311,936 B2 | 11/2012 | Haggerty et al. |
| 8,315,942 B2 | 11/2012 | Haggerty et al. |
| 8,315,943 B2 | 11/2012 | Torrez et al. |
| 8,321,334 B1 | 11/2012 | Kornegay et al. |
| 8,321,339 B2 | 11/2012 | Imrey et al. |
| 8,326,672 B2 | 12/2012 | Haggerty et al. |
| 8,327,429 B2 | 12/2012 | Speyer et al. |
| 8,335,741 B2 | 12/2012 | Kornegay et al. |
| 8,347,364 B2 | 1/2013 | Babi et al. |
| 8,359,278 B2 | 1/2013 | Domenikos et al. |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,452,611 B1 | 5/2013 | Johnson et al. |
| 8,458,062 B2 | 6/2013 | Dutt et al. |
| 8,458,074 B2 | 6/2013 | Showalter |
| 8,463,595 B1 | 6/2013 | Rehling et al. |
| 8,473,353 B2 | 6/2013 | Matsuda et al. |
| 8,478,686 B1 | 7/2013 | Giles |
| 8,489,502 B2 | 7/2013 | Morris et al. |
| 8,515,844 B2 | 8/2013 | Kasower |
| 8,527,596 B2 | 9/2013 | Long et al. |
| 8,533,118 B2 | 9/2013 | Weller et al. |
| 8,543,498 B2 | 9/2013 | Silbernagel et al. |
| 8,560,161 B1 | 10/2013 | Kator et al. |
| 8,560,434 B2 | 10/2013 | Morris et al. |
| 8,560,436 B2 | 10/2013 | Ingram et al. |
| 8,571,971 B1 | 10/2013 | Brown et al. |
| 8,572,083 B1 | 10/2013 | Snell et al. |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,626,646 B2 | 1/2014 | Torrez et al. |
| 8,630,929 B2 | 1/2014 | Haggerty et al. |
| 8,660,919 B2 | 2/2014 | Kasower |
| 8,694,420 B1 | 4/2014 | Oliai |
| 8,725,613 B1 | 5/2014 | Celka et al. |
| 8,732,004 B1 | 5/2014 | Ramos et al. |
| 8,738,516 B1 | 5/2014 | Dean et al. |
| 8,744,956 B1 | 6/2014 | DiChiara et al. |
| 8,760,417 B2 | 6/2014 | Haug |
| 8,762,243 B2 | 6/2014 | Jenkins et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,856,894 B1 | 10/2014 | Dean et al. |
| 8,930,216 B1 * | 1/2015 | Johnson .......... G06Q 40/025 705/2 |
| 8,930,262 B1 | 1/2015 | Searson et al. |
| 8,930,263 B1 | 1/2015 | Mahacek et al. |
| 8,983,867 B2 | 3/2015 | Stibel et al. |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,116,918 B1 | 8/2015 | Kim |
| 9,213,461 B2 | 12/2015 | Eraker et al. |
| 9,251,541 B2 | 2/2016 | Celka et al. |
| 9,256,904 B1 | 2/2016 | Haller et al. |
| 9,443,268 B1 | 9/2016 | Kapczynski et al. |
| 9,449,346 B1 | 9/2016 | Hockey et al. |
| 9,558,519 B1 | 1/2017 | Burger |
| 9,569,797 B1 | 2/2017 | Rohn et al. |
| 9,595,023 B1 | 3/2017 | Hockey et al. |
| 9,607,336 B1 | 3/2017 | Dean et al. |
| 9,690,820 B1 | 6/2017 | Girulat, Jr. |
| 9,710,852 B1 | 7/2017 | Olson et al. |
| 9,892,457 B1 | 2/2018 | Kapczynski |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,380,654 B2 | 8/2019 | Hirtenstein et al. |
| 10,417,704 B2 | 9/2019 | Searson et al. |
| 10,523,653 B2 | 12/2019 | Hockey et al. |
| 10,528,545 B1 | 1/2020 | Girulat, Jr. |
| 10,530,761 B2 | 1/2020 | Hockey et al. |
| 10,565,643 B2 | 2/2020 | Rohn et al. |
| 10,586,279 B1 | 3/2020 | Ramos et al. |
| 10,614,463 B1 | 4/2020 | Hockey et al. |
| 10,671,749 B2 | 6/2020 | Felice-Steele et al. |
| 10,726,491 B1 | 7/2020 | Hockey et al. |
| 10,757,154 B1 | 8/2020 | Jacobs et al. |
| 10,880,313 B2 | 12/2020 | Manna et al. |
| 10,937,090 B1 | 3/2021 | Debie et al. |
| 2001/0011247 A1 | 8/2001 | O'Flaherty et al. |
| 2001/0014868 A1 | 8/2001 | Herz et al. |
| 2001/0027413 A1 | 10/2001 | Bhutta |
| 2001/0029482 A1 | 10/2001 | Tealdi et al. |
| 2001/0034618 A1 | 10/2001 | Kessler et al. |
| 2001/0037289 A1 | 11/2001 | Mayr et al. |
| 2001/0039523 A1 | 11/2001 | Iwamoto |
| 2001/0042785 A1 | 11/2001 | Walker et al. |
| 2001/0044766 A1 | 11/2001 | Keyes |
| 2001/0049672 A1 | 12/2001 | Moore et al. |
| 2002/0010594 A1 | 1/2002 | Levine |
| 2002/0023051 A1 | 2/2002 | Kunzle et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0049624 A1 | 4/2002 | Raveis, Jr. |
| 2002/0052836 A1 | 5/2002 | Galperin et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0103680 A1 | 8/2002 | Newman |
| 2002/0107765 A1 | 8/2002 | Walker |
| 2002/0107849 A1 | 8/2002 | Hickey et al. |
| 2002/0111890 A1 | 8/2002 | Sloan et al. |
| 2002/0119824 A1 | 8/2002 | Allen |
| 2002/0128960 A1 | 9/2002 | Lambiotte et al. |
| 2002/0128962 A1 | 9/2002 | Kasower |
| 2002/0133503 A1 | 9/2002 | Amar et al. |
| 2002/0138417 A1 | 9/2002 | Lawrence |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0174124 A1 | 11/2002 | Haas et al. |
| 2002/0184054 A1 | 12/2002 | Cox et al. |
| 2002/0188478 A1 | 12/2002 | Breeland et al. |
| 2002/0194117 A1 | 12/2002 | Nabe et al. |
| 2002/0198736 A1 | 12/2002 | Harrison |
| 2002/0198806 A1 | 12/2002 | Blagg et al. |
| 2002/0198824 A1 | 12/2002 | Cook |
| 2003/0009415 A1 | 1/2003 | Lutnick et al. |
| 2003/0009418 A1 | 1/2003 | Green et al. |
| 2003/0018549 A1 | 1/2003 | Fei et al. |
| 2003/0028402 A1 | 2/2003 | Ulrich et al. |
| 2003/0028477 A1 | 2/2003 | Stevenson et al. |
| 2003/0033242 A1 | 2/2003 | Lynch et al. |
| 2003/0036926 A1 | 2/2003 | Starkey et al. |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046222 A1 | 3/2003 | Bard et al. |
| 2003/0050795 A1 | 3/2003 | Baldwin, Jr. et al. |
| 2003/0050796 A1 | 3/2003 | Baldwin, Jr. et al. |
| 2003/0064705 A1 | 4/2003 | Desierio |

(56) References Cited

U.S. PATENT DOCUMENTS

| | | |
|---|---|---|
| 2003/0065563 A1 | 4/2003 | Elliott et al. |
| 2003/0078877 A1 | 4/2003 | Beirne et al. |
| 2003/0078897 A1 | 4/2003 | Florance et al. |
| 2003/0101111 A1 | 5/2003 | Dang et al. |
| 2003/0110111 A1 | 6/2003 | Nalebuff et al. |
| 2003/0115122 A1 | 6/2003 | Slater et al. |
| 2003/0120591 A1 | 6/2003 | Birkhead et al. |
| 2003/0144950 A1 | 7/2003 | O'Brien et al. |
| 2003/0149659 A1 | 8/2003 | Danaher et al. |
| 2003/0154162 A1 | 8/2003 | Danaher et al. |
| 2003/0158960 A1 | 8/2003 | Engberg |
| 2003/0163435 A1 | 8/2003 | Payone |
| 2003/0172039 A1 | 9/2003 | Guy |
| 2003/0177091 A1 | 9/2003 | Paglin |
| 2003/0187768 A1 | 10/2003 | Ryan et al. |
| 2003/0187780 A1 | 10/2003 | Arthus et al. |
| 2003/0195830 A1 | 10/2003 | Merkoulovitch et al. |
| 2003/0204752 A1 | 10/2003 | Garrison |
| 2003/0208412 A1 | 11/2003 | Hillestad et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0229507 A1 | 12/2003 | Perge |
| 2003/0229580 A1 | 12/2003 | Gass et al. |
| 2003/0233259 A1 | 12/2003 | Mistretta et al. |
| 2003/0233323 A1 | 12/2003 | Bilski et al. |
| 2003/0236738 A1 | 12/2003 | Lange et al. |
| 2004/0006536 A1 | 1/2004 | Kawashima et al. |
| 2004/0010443 A1 | 1/2004 | May et al. |
| 2004/0023637 A1 | 2/2004 | Johnson et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044615 A1* | 3/2004 | Xue .................. G06Q 40/025 705/38 |
| 2004/0044617 A1 | 3/2004 | Lu |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078324 A1 | 4/2004 | Lonnberg et al. |
| 2004/0107125 A1 | 6/2004 | Guheen et al. |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117235 A1 | 6/2004 | Shacham |
| 2004/0117302 A1 | 6/2004 | Weichert et al. |
| 2004/0128230 A1 | 7/2004 | Oppenheimer et al. |
| 2004/0128236 A1 | 7/2004 | Brown et al. |
| 2004/0133493 A1 | 7/2004 | Ford et al. |
| 2004/0138995 A1 | 7/2004 | Hershkowitz et al. |
| 2004/0143546 A1 | 7/2004 | Wood et al. |
| 2004/0153437 A1 | 8/2004 | Buchan |
| 2004/0158521 A1 | 8/2004 | Newton |
| 2004/0158523 A1 | 8/2004 | Dort |
| 2004/0158723 A1 | 8/2004 | Root |
| 2004/0159700 A1 | 8/2004 | Khan et al. |
| 2004/0163101 A1 | 8/2004 | Swix |
| 2004/0177030 A1 | 9/2004 | Shoham |
| 2004/0186807 A1 | 9/2004 | Nathans et al. |
| 2004/0193535 A1 | 9/2004 | Barazesh |
| 2004/0199456 A1 | 10/2004 | Flint et al. |
| 2004/0199458 A1 | 10/2004 | Ho |
| 2004/0199462 A1 | 10/2004 | Starrs |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0225545 A1 | 11/2004 | Turner et al. |
| 2004/0225594 A1 | 11/2004 | Nolan, III et al. |
| 2004/0225597 A1 | 11/2004 | Oppenheimer et al. |
| 2004/0230534 A1 | 11/2004 | McGough |
| 2004/0243450 A1 | 12/2004 | Bernard, Jr. et al. |
| 2004/0243506 A1 | 12/2004 | Das |
| 2004/0249532 A1 | 12/2004 | Kelly et al. |
| 2004/0255127 A1 | 12/2004 | Arnouse |
| 2004/0267660 A1 | 12/2004 | Greenwood et al. |
| 2005/0004855 A1 | 1/2005 | Jenson et al. |
| 2005/0004870 A1 | 1/2005 | McGaughey |
| 2005/0010513 A1 | 1/2005 | Duckworth et al. |
| 2005/0027632 A1 | 2/2005 | Zeitoun et al. |
| 2005/0027633 A1 | 2/2005 | Fortuna et al. |
| 2005/0055275 A1 | 3/2005 | Newman et al. |
| 2005/0065874 A1 | 3/2005 | Lefner et al. |
| 2005/0080697 A1 | 4/2005 | Foss et al. |
| 2005/0080716 A1 | 4/2005 | Belyi et al. |
| 2005/0080821 A1 | 4/2005 | Breil et al. |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0086176 A1 | 4/2005 | Dahlgren |
| 2005/0096950 A1 | 5/2005 | Caplan et al. |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102206 A1 | 5/2005 | Savasoglu et al. |
| 2005/0102226 A1 | 5/2005 | Oppenheimer et al. |
| 2005/0105719 A1 | 5/2005 | Huda |
| 2005/0125291 A1 | 6/2005 | Demkiw Grayson et al. |
| 2005/0125350 A1 | 6/2005 | Tidwell et al. |
| 2005/0130704 A1 | 6/2005 | McParland et al. |
| 2005/0137912 A1 | 6/2005 | Rao et al. |
| 2005/0137963 A1 | 6/2005 | Ricketts et al. |
| 2005/0144067 A1 | 6/2005 | Farahat et al. |
| 2005/0154617 A1 | 7/2005 | Ruggieri et al. |
| 2005/0154664 A1 | 7/2005 | Guy et al. |
| 2005/0154769 A1 | 7/2005 | Eckart et al. |
| 2005/0159996 A1 | 7/2005 | Lazaraus et al. |
| 2005/0177489 A1 | 8/2005 | Neff et al. |
| 2005/0197953 A1 | 9/2005 | Broadbent et al. |
| 2005/0197954 A1 | 9/2005 | Maitland et al. |
| 2005/0203768 A1 | 9/2005 | Florance |
| 2005/0209880 A1 | 9/2005 | Drelicharz et al. |
| 2005/0209922 A1 | 9/2005 | Hofmeister |
| 2005/0228748 A1 | 10/2005 | Togher et al. |
| 2005/0251474 A1 | 11/2005 | Shinn et al. |
| 2005/0251820 A1 | 11/2005 | Stefanik et al. |
| 2005/0267840 A1 | 12/2005 | Holm-Blagg et al. |
| 2005/0273431 A1 | 12/2005 | Abel et al. |
| 2005/0278246 A1 | 12/2005 | Friedman et al. |
| 2005/0279824 A1 | 12/2005 | Anderson et al. |
| 2005/0279827 A1 | 12/2005 | Mascavage et al. |
| 2006/0004731 A1 | 1/2006 | Seibel et al. |
| 2006/0014129 A1 | 1/2006 | Coleman et al. |
| 2006/0031158 A1 | 2/2006 | Orman |
| 2006/0041443 A1 | 2/2006 | Horvath |
| 2006/0059073 A1 | 3/2006 | Walzak |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0089842 A1 | 4/2006 | Medawar |
| 2006/0095363 A1 | 5/2006 | May |
| 2006/0100954 A1 | 5/2006 | Schoen |
| 2006/0122921 A1 | 6/2006 | Comerford et al. |
| 2006/0123461 A1 | 6/2006 | Lunt et al. |
| 2006/0129428 A1 | 6/2006 | Wennberg |
| 2006/0131390 A1 | 6/2006 | Kim |
| 2006/0149674 A1 | 7/2006 | Cook et al. |
| 2006/0155639 A1 | 7/2006 | Lynch et al. |
| 2006/0163347 A1 | 7/2006 | Foss et al. |
| 2006/0173772 A1 | 8/2006 | Hayes et al. |
| 2006/0177226 A1 | 8/2006 | Ellis, III |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0195351 A1 | 8/2006 | Bayburtian |
| 2006/0195391 A1* | 8/2006 | Stanelle .................. G06Q 40/02 705/38 |

(56) References Cited

U.S. PATENT DOCUMENTS

| | | |
|---|---|---|
| 2006/0200396 A1 | 9/2006 | Satterfield et al. |
| 2006/0202012 A1 | 9/2006 | Grano et al. |
| 2006/0206416 A1 | 9/2006 | Farias |
| 2006/0212386 A1 | 9/2006 | Willey et al. |
| 2006/0218079 A1 | 9/2006 | Goldblatt et al. |
| 2006/0229799 A1 | 10/2006 | Nimmo et al. |
| 2006/0229961 A1 | 10/2006 | Lyftogt et al. |
| 2006/0229996 A1 | 10/2006 | Keithley et al. |
| 2006/0233332 A1 | 10/2006 | Toms |
| 2006/0235743 A1 | 10/2006 | Long et al. |
| 2006/0241923 A1 | 10/2006 | Xu et al. |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0247947 A1 | 11/2006 | Suringa |
| 2006/0247991 A1 | 11/2006 | Jin et al. |
| 2006/0248106 A1 | 11/2006 | Milne |
| 2006/0259364 A1 | 11/2006 | Strock et al. |
| 2006/0265323 A1 | 11/2006 | Winter et al. |
| 2006/0267999 A1 | 11/2006 | Cash et al. |
| 2006/0271457 A1 | 11/2006 | Romain et al. |
| 2006/0271633 A1 | 11/2006 | Adler |
| 2006/0277141 A1 | 12/2006 | Palmer |
| 2006/0282359 A1 | 12/2006 | Nobili et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016520 A1 | 1/2007 | Gang et al. |
| 2007/0027778 A1 | 2/2007 | Schellhammer et al. |
| 2007/0027791 A1 | 2/2007 | Young et al. |
| 2007/0038568 A1 | 2/2007 | Greene et al. |
| 2007/0043654 A1 | 2/2007 | Libman |
| 2007/0067206 A1 | 3/2007 | Haggerty et al. |
| 2007/0067207 A1 | 3/2007 | Haggerty et al. |
| 2007/0067297 A1 | 3/2007 | Kublickis |
| 2007/0078741 A1 | 4/2007 | Haggerty et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094137 A1 | 4/2007 | Phillips et al. |
| 2007/0100719 A1 | 5/2007 | Chwast et al. |
| 2007/0106582 A1 | 5/2007 | Baker et al. |
| 2007/0112668 A1 | 5/2007 | Celano et al. |
| 2007/0118410 A1 | 5/2007 | Nadai |
| 2007/0124235 A1 | 5/2007 | Chakraborty et al. |
| 2007/0156718 A1 | 7/2007 | Hossfeld et al. |
| 2007/0168267 A1 | 7/2007 | Zimmerman et al. |
| 2007/0174122 A1 | 7/2007 | Howard et al. |
| 2007/0179798 A1 | 8/2007 | Inbarajan |
| 2007/0192165 A1 | 8/2007 | Haggerty et al. |
| 2007/0198336 A1 | 8/2007 | Thompson |
| 2007/0198407 A1 | 8/2007 | Winter |
| 2007/0208640 A1 | 9/2007 | Banasiak et al. |
| 2007/0214000 A1 | 9/2007 | Shahrabi et al. |
| 2007/0214005 A1 | 9/2007 | Kennedy |
| 2007/0226093 A1 | 9/2007 | Chan et al. |
| 2007/0226114 A1 | 9/2007 | Haggerty et al. |
| 2007/0226130 A1 | 9/2007 | Haggerty et al. |
| 2007/0233591 A1 | 10/2007 | Newton |
| 2007/0244732 A1 | 10/2007 | Chatterji et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0260539 A1 | 11/2007 | Delinsky |
| 2007/0266439 A1 | 11/2007 | Kraft |
| 2007/0271178 A1 | 11/2007 | Davis et al. |
| 2007/0279187 A1 | 12/2007 | Hekmatpour et al. |
| 2007/0282736 A1 | 12/2007 | Conlin et al. |
| 2007/0288271 A1 | 12/2007 | Klinkhammer |
| 2007/0288338 A1 | 12/2007 | Hoadley |
| 2007/0288360 A1 | 12/2007 | Seeklus |
| 2007/0288490 A1 | 12/2007 | Longshaw |
| 2007/0294126 A1 | 12/2007 | Maggio |
| 2007/0294163 A1 | 12/2007 | Harmon et al. |
| 2007/0299699 A1 | 12/2007 | Policelli et al. |
| 2007/0299770 A1 | 12/2007 | Delinsky |
| 2007/0299771 A1 | 12/2007 | Brody |
| 2008/0010203 A1 | 1/2008 | Grant |
| 2008/0015954 A1 | 1/2008 | Huber et al. |
| 2008/0015979 A1 | 1/2008 | Bentley |
| 2008/0021802 A1 | 1/2008 | Pendleton |
| 2008/0027841 A1 | 1/2008 | Eder |
| 2008/0027859 A1 | 1/2008 | Nathans et al. |
| 2008/0046351 A1 | 2/2008 | Wiener et al. |
| 2008/0052182 A1 | 2/2008 | Marshall |
| 2008/0052224 A1 | 2/2008 | Parker |
| 2008/0059317 A1 | 3/2008 | Chandran et al. |
| 2008/0059364 A1 | 3/2008 | Tidwell et al. |
| 2008/0065530 A1 | 3/2008 | Talbert et al. |
| 2008/0065569 A1 | 3/2008 | Dutt et al. |
| 2008/0086400 A1 | 4/2008 | Ardelean et al. |
| 2008/0097768 A1 | 4/2008 | Godshalk |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0120133 A1 | 5/2008 | Krishnaswami et al. |
| 2008/0120155 A1 | 5/2008 | Pliha |
| 2008/0133278 A1 | 6/2008 | Stanfield |
| 2008/0133322 A1 | 6/2008 | Kalia et al. |
| 2008/0133325 A1 | 6/2008 | De et al. |
| 2008/0140507 A1 | 6/2008 | Hamlisch et al. |
| 2008/0147454 A1 | 6/2008 | Walker et al. |
| 2008/0147523 A1 | 6/2008 | Mulry et al. |
| 2008/0154766 A1 | 6/2008 | Lewis et al. |
| 2008/0162383 A1 | 7/2008 | Kraft |
| 2008/0167883 A1 | 7/2008 | Thavildar Khazaneh |
| 2008/0172324 A1 | 7/2008 | Johnson |
| 2008/0177655 A1 | 7/2008 | Zalik |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0205774 A1 | 8/2008 | Brinker et al. |
| 2008/0208610 A1 | 8/2008 | Thomas et al. |
| 2008/0215470 A1 | 9/2008 | Sengupta et al. |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0228635 A1 | 9/2008 | Megdal et al. |
| 2008/0255897 A1 | 10/2008 | Megdal et al. |
| 2008/0255922 A1 | 10/2008 | Feldman et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294540 A1 | 11/2008 | Celka et al. |
| 2008/0294546 A1 | 11/2008 | Flannery |
| 2008/0294996 A1 | 11/2008 | Hunt et al. |
| 2008/0312969 A1 | 12/2008 | Raines et al. |
| 2008/0319895 A1 | 12/2008 | Lazerson |
| 2009/0006185 A1 | 1/2009 | Stinson |
| 2009/0007231 A1 | 1/2009 | Kaiser et al. |
| 2009/0012889 A1 | 1/2009 | Finch |
| 2009/0018996 A1 | 1/2009 | Hunt et al. |
| 2009/0044279 A1 | 2/2009 | Crawford et al. |
| 2009/0055322 A1 | 2/2009 | Bykov et al. |
| 2009/0063330 A1 | 3/2009 | Cerise et al. |
| 2009/0089190 A1 | 4/2009 | Girulat |
| 2009/0089205 A1 | 4/2009 | Bayne |
| 2009/0099960 A1 | 4/2009 | Robida et al. |
| 2009/0106846 A1 | 4/2009 | Dupray et al. |
| 2009/0112650 A1 | 4/2009 | Iwane |
| 2009/0119199 A1 | 5/2009 | Salahi |
| 2009/0119299 A1 | 5/2009 | Rhodes |
| 2009/0126013 A1 | 5/2009 | Atwood et al. |
| 2009/0132347 A1 | 5/2009 | Anderson et al. |
| 2009/0144160 A1 | 6/2009 | Haggerty et al. |
| 2009/0144185 A1 | 6/2009 | Haggerty et al. |
| 2009/0158030 A1 | 6/2009 | Rasti |

(56) References Cited

U.S. PATENT DOCUMENTS

| | | |
|---|---|---|
| 2009/0164380 A1 | 6/2009 | Brown |
| 2009/0171723 A1 | 7/2009 | Jenkins |
| 2009/0172815 A1 | 7/2009 | Gu et al. |
| 2009/0177480 A1 | 7/2009 | Chen et al. |
| 2009/0182653 A1 | 7/2009 | Zimiles |
| 2009/0199264 A1 | 8/2009 | Lang |
| 2009/0210886 A1 | 8/2009 | Bhojwani et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0234775 A1 | 9/2009 | Whitney et al. |
| 2009/0240609 A1 | 9/2009 | Cho et al. |
| 2009/0240624 A1 | 9/2009 | James et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0271248 A1 | 10/2009 | Sherman et al. |
| 2009/0276244 A1 | 11/2009 | Baldwin, Jr. et al. |
| 2009/0289110 A1 | 11/2009 | Regen et al. |
| 2009/0299911 A1 | 12/2009 | Abrahams et al. |
| 2009/0313163 A1 | 12/2009 | Wang et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0017300 A1 | 1/2010 | Bramlage et al. |
| 2010/0023434 A1 | 1/2010 | Bond |
| 2010/0030649 A1 | 2/2010 | Ubelhor |
| 2010/0082476 A1 | 4/2010 | Bowman |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0122316 A1 | 5/2010 | Lyon |
| 2010/0142698 A1 | 6/2010 | Spottiswoode et al. |
| 2010/0145836 A1 | 6/2010 | Baker et al. |
| 2010/0145840 A1 | 6/2010 | Kasower |
| 2010/0174638 A1 | 7/2010 | Debie et al. |
| 2010/0223168 A1 | 9/2010 | Haggerty et al. |
| 2010/0223211 A1 | 9/2010 | Johnson et al. |
| 2010/0228657 A1 | 9/2010 | Kagarlis |
| 2010/0228658 A1 | 9/2010 | Ketelsen et al. |
| 2010/0250411 A1 | 9/2010 | Ogrodski |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0293114 A1 | 11/2010 | Khan et al. |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0016042 A1 | 1/2011 | Cho et al. |
| 2011/0029427 A1 | 2/2011 | Haggerty et al. |
| 2011/0047071 A1 | 2/2011 | Choudhuri et al. |
| 2011/0060654 A1 | 3/2011 | Elliott et al. |
| 2011/0060673 A1 | 3/2011 | Delinsky et al. |
| 2011/0078073 A1 | 3/2011 | Annappindi et al. |
| 2011/0093383 A1 | 4/2011 | Haggerty et al. |
| 2011/0112950 A1 | 5/2011 | Haggerty et al. |
| 2011/0112958 A1 | 5/2011 | Haggerty et al. |
| 2011/0125632 A1 | 5/2011 | Neel |
| 2011/0137924 A1 | 6/2011 | Hunt et al. |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0184838 A1 | 7/2011 | Winters et al. |
| 2011/0213641 A1 | 9/2011 | Metzger, II et al. |
| 2011/0218826 A1 | 9/2011 | Birtel et al. |
| 2011/0238566 A1 | 9/2011 | Santos |
| 2011/0270779 A1 | 11/2011 | Showalter |
| 2011/0282779 A1 | 11/2011 | Megdal et al. |
| 2011/0295733 A1 | 12/2011 | Megdal et al. |
| 2012/0005070 A1 | 1/2012 | McFall et al. |
| 2012/0029956 A1 | 2/2012 | Ghosh et al. |
| 2012/0054090 A1 | 3/2012 | Haggerty et al. |
| 2012/0066065 A1 | 3/2012 | Switzer |
| 2012/0066106 A1 | 3/2012 | Papadimitriou |
| 2012/0066116 A1 | 3/2012 | Kornegay et al. |
| 2012/0101938 A1 | 4/2012 | Kasower |
| 2012/0101939 A1 | 4/2012 | Kasower |
| 2012/0116950 A1 | 5/2012 | Torrez et al. |
| 2012/0116951 A1 | 5/2012 | Chung et al. |
| 2012/0123931 A1 | 5/2012 | Megdal et al. |
| 2012/0136774 A1 | 5/2012 | Imrey et al. |
| 2012/0158574 A1 | 6/2012 | Brunzell et al. |
| 2012/0191596 A1 | 7/2012 | Kremen et al. |
| 2012/0215682 A1 | 8/2012 | Lent et al. |
| 2012/0239553 A1 | 9/2012 | Gonen et al. |
| 2012/0246048 A1 | 9/2012 | Cohen et al. |
| 2012/0253852 A1 | 10/2012 | Pourfallah et al. |
| 2012/0254018 A1 | 10/2012 | Davies et al. |
| 2012/0265661 A1 | 10/2012 | Megdal et al. |
| 2012/0278767 A1 | 11/2012 | Stibel et al. |
| 2012/0317016 A1 | 12/2012 | Hughes |
| 2012/0324388 A1 | 12/2012 | Rao et al. |
| 2012/0330689 A1 | 12/2012 | McLaughlin et al. |
| 2013/0006825 A1 | 1/2013 | Robida et al. |
| 2013/0080315 A1 | 3/2013 | Torrez et al. |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0151388 A1 | 6/2013 | Falkenborg et al. |
| 2013/0173450 A1 | 7/2013 | Celka et al. |
| 2013/0173451 A1 | 7/2013 | Kornegay et al. |
| 2013/0191261 A1 | 7/2013 | Chandler et al. |
| 2013/0205135 A1 | 8/2013 | Lutz |
| 2013/0317954 A1 | 11/2013 | Psota et al. |
| 2013/0332338 A1 | 12/2013 | Yan et al. |
| 2013/0332341 A1 | 12/2013 | Papadimitriou |
| 2013/0339249 A1 | 12/2013 | Weller et al. |
| 2014/0012734 A1 | 1/2014 | Megdal et al. |
| 2014/0019333 A1 | 1/2014 | Morris et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0081835 A1 | 3/2014 | Choudhuri et al. |
| 2014/0095251 A1 | 4/2014 | Huovilainen |
| 2014/0110477 A1 | 4/2014 | Hammad |
| 2014/0156501 A1 | 6/2014 | Howe |
| 2014/0244353 A1 | 8/2014 | Winters |
| 2014/0258089 A1 | 9/2014 | Pearson et al. |
| 2014/0279329 A1 | 9/2014 | Dancel |
| 2014/0279382 A1 | 9/2014 | Drakeley et al. |
| 2014/0372367 A1 | 12/2014 | McLean et al. |
| 2015/0026014 A1 | 1/2015 | Kasower |
| 2015/0026039 A1 | 1/2015 | Annappindi |
| 2015/0073929 A1 | 3/2015 | Psota et al. |
| 2015/0112874 A1 | 4/2015 | Serio et al. |
| 2015/0161738 A1 | 6/2015 | Stempora |
| 2015/0199757 A1 | 7/2015 | Lindholme et al. |
| 2015/0200948 A1 | 7/2015 | Cairns et al. |
| 2015/0228016 A1 | 8/2015 | Chandler |
| 2016/0125412 A1 | 5/2016 | Cannon |
| 2016/0224996 A1 | 8/2016 | Hunt et al. |
| 2017/0161486 A1 | 6/2017 | Jeon et al. |
| 2017/0228820 A1 | 8/2017 | Rohn |
| 2017/0262758 A1 | 9/2017 | Boyapalle et al. |
| 2017/0323063 A1 | 11/2017 | Krause et al. |
| 2017/0323358 A1 | 11/2017 | Psota et al. |
| 2017/0352014 A1 | 12/2017 | Smith et al. |
| 2018/0040063 A1 | 2/2018 | Buechler et al. |
| 2018/0082371 A1 | 3/2018 | Chandler |

(56) References Cited

U.S. PATENT DOCUMENTS

| | | |
|---|---|---|
| 2018/0204279 A1 | 7/2018 | Painter et al. |
| 2018/0218069 A1 | 8/2018 | Rege et al. |
| 2018/0218448 A1 | 8/2018 | Thomas et al. |
| 2018/0285886 A1 | 10/2018 | Yan et al. |
| 2019/0066203 A1 | 2/2019 | Smith et al. |
| 2019/0156227 A1 | 5/2019 | Duke et al. |
| 2019/0188717 A1 | 6/2019 | Putnam et al. |
| 2019/0318122 A1 | 10/2019 | Hockey et al. |
| 2020/0034927 A1 | 1/2020 | Smith et al. |
| 2020/0074100 A1 | 3/2020 | Raneri et al. |
| 2020/0074541 A1 | 3/2020 | Finneran et al. |
| 2020/0074542 A1 | 3/2020 | Manna et al. |
| 2020/0076813 A1 | 3/2020 | Felice-Steele et al. |
| 2020/0106764 A1 | 4/2020 | Hockey et al. |
| 2020/0106765 A1 | 4/2020 | Hockey et al. |
| 2020/0201878 A1 | 6/2020 | Putnam et al. |
| 2020/0202425 A1 | 6/2020 | Taylor-Shoff et al. |
| 2020/0211099 A1 | 7/2020 | Smith et al. |
| 2020/0211103 A1 | 7/2020 | Searson et al. |
| 2020/0213206 A1 | 7/2020 | Bracken et al. |
| 2020/0233850 A1 | 7/2020 | Girulat, Jr. |
| 2020/0327610 A1 | 10/2020 | Rohn et al. |
| 2020/0389461 A1 | 12/2020 | Felice-Steele et al. |

FOREIGN PATENT DOCUMENTS

| | | |
|---|---|---|
| DE | 91 08 341 | 10/1991 |
| EP | 0 350 907 | 1/1990 |
| EP | 0 468 440 | 1/1992 |
| EP | 0 554 083 | 8/1993 |
| EP | 0 566 736 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 122 664 | 8/2001 |
| JP | 2001-282957 | 10/2001 |
| JP | 2002-163449 | 6/2002 |
| JP | 2003-016261 | 1/2003 |
| JP | 2003-316950 | 11/2003 |
| KR | 10-0638324 | 10/2006 |
| MX | 2007-015510 | 4/2008 |
| TW | 256569 | 6/2006 |
| WO | WO 94/006103 | 3/1994 |
| WO | WO 94/012943 | 6/1994 |
| WO | WO 95/012857 | 5/1995 |
| WO | WO 99/004350 | 1/1999 |
| WO | WO 99/046710 | 9/1999 |
| WO | WO 00/011574 | 3/2000 |
| WO | WO 00/055789 | 9/2000 |
| WO | WO 00/055790 | 9/2000 |
| WO | WO 01/004821 | 1/2001 |
| WO | WO 01/009787 | 2/2001 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/041355 | 6/2001 |
| WO | WO 01/057720 | 8/2001 |
| WO | WO 01/075754 | 10/2001 |
| WO | WO 01/080053 | 10/2001 |
| WO | WO 01/084281 | 11/2001 |
| WO | WO 02/013047 | 2/2002 |
| WO | WO 03/101123 | 12/2003 |
| WO | WO 2004/114160 | 12/2004 |
| WO | WO 2005/022348 | 3/2005 |
| WO | WO 2005/124619 | 12/2005 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2007/149941 | 12/2007 |
| WO | WO 2008/021061 | 2/2008 |
| WO | WO 2008/022289 | 2/2008 |
| WO | WO 2008/147918 | 12/2008 |
| WO | WO 2009/061342 | 5/2009 |
| WO | WO 2009/064840 | 5/2009 |
| WO | WO 2009/099448 | 8/2009 |
| WO | WO 2009/132114 | 10/2009 |
| WO | WO 2010/129257 | 11/2010 |
| WO | WO 2018/144612 | 8/2018 |
| WO | WO 2019/103979 | 5/2019 |
| WO | WO 2020/051154 | 3/2020 |

OTHER PUBLICATIONS

Credit Scoring Systems Used To Measure Bankruptcy Risk. (1991). Credit Risk Management Report, 1(2), N/A. Retrieved from https://dialog.proquest.com/professional/docview/1078503725?accountid=131444 on Jun. 11, 2021 (Year: 1991).*

Ralston, D., & Wright, A. (2003). Lending procedures and the viability-social objectives conflict in credit unions. The International Journal of Bank Marketing, 21(6), 304-311. doi:http://dx.doi.org/10.1108/02652320310498456 on Jun. 11, 2021 (Year: 2003).*

U.S. Appl. No. 12/706,489, filed Feb. 12, 2010, Bargoli et al.

U.S. Appl. No. 12/705,511, filed Feb. 12, 2010, Bargoli et al.

"ACS Company Birch & Davis Wins Texas CHIP Contract," PR Newswire, Section: Financial News, May 17, 2000, Dallas, TX, pp. 3.

"An Even Better Solution to Financing Elective Surgery . . . ", Unicorn Financial, pp. 7, http://web.archive.org/web/20000816161359/http://www.unicornfinancial.com/, as downloaded Oct. 15, 2008.

Apte, et al., "A Probabilistic Estimation Framework for Predictive Modeling Analytics," IBM Systems Journal, 2002, vol. 41, No. 3, pp. 438-448.

"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.

AISG's National Underwriting Database, A-PLUS, is Now the Largest in the Industry, Business Wire, Aug. 7, 1997.

An Expert System for Determining Medicaid Eligibility, Journal of Medical Systems, vol. 12, Nov. 5, 1988, in 10 pages.

Announcing TrueProfiler, http://web.archive.org/web/20021201123646/http://www.truecredit.com/index.asp, dated Dec. 1, 2002, 2 pages.

"AT&T Expected to Turn Up Heat in Card Wars", American Banker, May 27, 1993, vol. 158, No. 101, pp. 3.

Avery et al., "Consumer Credit Scoring: Do Situational Circumstances Matter?", Journal of Banking & Finance, vol. 28, 2004, pp. 835-856.

Awoonor-Williams, Princess Josephine, Ph.D. "Gender and Credit: An Analysis of Women's Experience in the Credit Market", ProQuest Dissertations and Theses, 2004, pp. 148.

"Balance Transfers Offer Opportunities", Risk Credit Risk Management Report, Jan. 29, 1996, vol. 6, No. 2, pp. 2.

Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].

Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.

Bilotta, Caryn, "Understanding Credit Scores," Pittsburgh Post—Gazette, May 9, 2010.

"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].

Boss, Shira J. "Elective Surgery Without the Plastic: Low-Interest Medical Financing Provides Alternative to Credit Cards," factiva, Crain's New York Business, 2 pgs., dated Jun. 22, 1998.

Broward County CAP Grant Application, as printed on Aug. 10, 2009, 41 pgs.

(56) References Cited

OTHER PUBLICATIONS

Burr PH.D., et al., "Utility Payments as Alternative Credit Data: A Reality Check", Asset Builders of America, Inc., Oct. 5, 2006, pp. 1-18, Washington, D.C.
Calnan, Christopher, "Tenet, Fair Isaac invest $20M in startup," MHT, Mass High Tech: The Journal of New England Technology, dated Jul. 23, 2007, 2 pgs.
Cantor, R. and Packer, F., "The Credit Rating Industry," FRBNY Quarterly Review, Summer-Fall, 1994, pp. 1-24.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Cheney, Karen, "Fix Your Nose, If You Wish, But Not With This New Loan," Money Magazine, vol. 27, No. 5, 1 pg., dated May 1, 1998.
Chores & Allowances, "Do Kids Have Credit Reports?" Oct. 15, 2007, http://choresandallowances.blogspot.com/2007/10/do-kids-have-credit-reports.html, pp. 5.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Cowie, Norman, "Warning Bells & 'The Bust-Out'", Business Credit, Jul. 1, 2000, pp. 5.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Demby, Elayne, "Special Report: Letting Consumers Know the Score—and More", Collections and Credit Risk, New York, Feb. 2003, vol. 8, Issue 2, p. 53, pp. 3.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Dietz, Ellen, "Dental Office Management," 8 pgs., pp. 316-321, Copyright 2000.
Dillon et al., "Good Science", Marketing Research: A Magazine of Management & Applications TM, Winter 1997, vol. 9, No. 4; pp. 11.
Downes et al., Dictionary of Finance and Investment Terms, Fifth Edition, 1998, pp. 332-333.
Downing, Jr.; Richard, "Changes to the Credit Reporting Act," Mortgage Banking, Apr. 1, 1998, vol. 58, No. 7, pp. 82-85.
Dymi, Amilda, Need for Leads Spurs Some Upgrades, Origination News-Special Report, May 1, 2008, vol. Vol. 17, Issue No. 8, Pages pp. 24, Atlanta, Copyright 2008 SourceMedia, Inc.
EFunds Corporation, "Data & Decisioning: Debit Report" printed Apr. 1, 2007, http://www.efunds.com/web/industry-solutions/financial-services/frm-debit-report/htm in 1 page.
EFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian Announces PLUS Score; Experian Press Release dated Oct. 16, 2003; Experian Global Press Office.
Experian-Scorex Announces New Credit Simulation Tool, PR Newswire, Costa Mesa, CA, Jun. 13, 2005.
Experian, Custom Strategist and Qualifile from Funds, 2000, in 2 pages.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fair Isaac Corporation, myFICO: Calculators: Credit Assessment, as printed Jun. 8, 2005 in 2 pages, http://www.myfico.com/CreditEducation/Calculators/CreditAssessment.aspx.
Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Sample: Fico Score Simulator: Max Out All Your Credit Cards, as printed Jun. 8, 2005 in 2 pages, http://www.myfico.com/Content/Samples/Sample_ScoreSimulatorResults.asp?Simulation=4&ReportID=1& productID=&Execute.x=105&Execute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1 &ProductID=&Execute.x81&Execute.y=28>.

(56) References Cited

OTHER PUBLICATIONS

Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Suggested Best Action, as printed Jun. 8' 2005 in 2 pages, http://www.myfico.com/Content/Samples/Sample_ScoreSimulatorResults.asp?Simulation=111&ReportID=1&ProductID=&TopAction.x=66&TopAction.y=16.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Felsenthal, Edward, "Health Costs; Managed Care Helps Curb Costs, Study Says," The Wall Street Journal, dated Aug. 12, 1991.
Fickenscher, Lisa, "Merchant American Express Seeks to Mine its Data on Cardholder Spending Patterns," American Banker, vol. 162, Issue 56, Mar. 24, 1997, pp. 1-2.
FICO Guide Service, Nov. 20, 2000, https://www.ficoguide.com/sample_report.cfm, 10 pages.
"Financing Medical Procedures A Lucrative But Risky Business," Credit Risk Management Report, vol. 10, Issue 15, 2 pgs., dated Aug. 7, 2000.
Fisher, Joseph, "Access to Fair Credit Reports: Current Practices and Proposed Legislation," American Business Law Journal, Fall 1981, vol. 19, No. 3, Pg. 319.
Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Credit Agency Moving Into Health Care," NewsRoom, The Seattle Times, Section: Scene, Mar. 22, 1995, pp. 3, http://web2.westlaw.com/result/documenttext.aspx?rs-WLW8.03&ss+CNT&rp=%2fWelc . . . .
Giudici, Paolo, "Bayesian Data Mining, with Application to Benchmarking and Credit Scoring," Applied Stochastic Models In Business and Industry, 2001, vol. 17, pp. 69-81.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
Gopalan, R., "Panning for Sales-Force Gold", Intelligent Enterprise, Dec. 21, 1999, vol. 2, No. 18, pp. 39-43.
Henry, M.D., Kimberly A., "The Face-Lift Sourcebook," copyright 2000, 3 pgs. (p. 207).
How Much Does a Low FICO Score Cost? Jul. 14, 2000, http://ficobuilder.com/kbsrch.htm, 2 pages.
ID Theft Assist, "Do You Know Where Your Child's Credit Is?", Nov. 26, 2007, http://www.idtheftassist.com/pp./story14, pp. 3.
Ideon, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
IndiCareTM, On-Line Patient Assistant Program, Website Users Manual, JBI Associates, LLC, 1997.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/p./news/pr/pr_archive?mode-single&pr_id=117, printed Oct. 4, 2007 in 2 pages.
Instant Access to Credit Reports Now Available Online with DMS' CreditBrowser-based system also Simplifies Credit Decisioning and Offers a Central Point of Control, Business Wire, Dallas, May 23, 2000, p. 0264.
Internal Revenue Service Data Book 2000, Issued Aug. 2001, Revised May 2003.
774 Jacob et al., A Case Study of Checking Account Inquiries and Closures in Chicago, The Center for Financial Services Innovation, Nov. 2006.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Kent, Heather, "Huge declines in price as competition heats up in Vancouver's booming laser-surgery market," CMAJ, Oct. 5, 1999; 161 (7), pp. 857-858.
Kuykendall, Lavonne, "Divergent Paths in Early Pacts with Credit Bureaus", American Banker, May 30, 2002, vol. 167, No. 3, pp. 2.
Lamons, Bob, "Be Smart: Offer Inquiry Qualification Services," Marketing News, ABI/Inform Global, Nov. 6, 1995, vol. 29, No. 23, pp. 13.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.
Lee, W.A., "Experian Eyes Payments, Mulls Deals" American Banker: The Financial Services Daily, 2pgs., New York, May 30, 2003.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
LifeLock, "Identity Theft F.A.Q." http://web.archive.org/web/20080215093614/http://www.identitytheftkiller.com/promo/faq.php, Feb. 15, 2008, pp. 8.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Lund, Graham, "Credit Bureau Data: Maximizing the Benefits," Credit Management, May 2004, ProQuest Central, pp. 44-45.
Mathematica Policy Research, Inc., "1998 Health Care Survey of DoD Beneficiaries: Technical Manual," Jul. 1999.
McGOVERN, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].

(56) References Cited

OTHER PUBLICATIONS

Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
NewsRoom, "CIGNA Report Withdrawn As Foe Sees Opening," Insurance Regulator, State Survey, Sep. 9, 1996, vol. 8, Issue 34, pp. 4.
"Normalize," http://www.merriam-webster.com/dictionary/normalize printed Jun. 14, 2010.
Occasional CF Newsletter; http://www.halhelms.com/index.cfm?fuseaction-newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttextaspx?rs-WLW8.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Powerforms: Declarative Client-Side for Field Validation, ISSN 1386-145x, Dec. 2000.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
RapUP, Attribute Management & Report Systems:Absolute Advantage!, Magnum Communications Brochure, Copyright 2004, pp. 5.
"Recognition and use by Appraisers of Energy-Performance Benchmarking Tools for Commercial Buildings," prepared by the Institute for Market Transformation, NYSERDA, Feb. 2003, pp. 6.
Rubin, Rita, "Cosmetic Surgery on Credit, Finance plans let patients reconstruct now, pay later," The Dallas Morning News, 2 pgs., dated Sep. 10, 1988.
Saunders, A., "Data Goldmine," Management Today, London: Mar. 1, 2004, 6 pages.
Schmidt, David, "Environmental Impact: The Changing Credit Reporting Landscape," Business Credit, Apr. 2003, vol. 105, No. 4, pp. 14 (electronic copy is in 5 pages).
SearchAmerica, "Payment Advisor Suite TM", Solutions, 2009, pp. 2.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
State of Wisconsin, Division of Health Care Financing, Department of Health and Family Services: 1999-2001 Biennial Report, pp. 17-21.
Stein, Benchmarking Default Prediction Models: Pitfalls and Remedies in Model Validation, Moody's KMV, Revised Jun. 13, 2002, Technical Report #020305; New York.
Sumner, Anthony, "Tackling the Issue of Bust-Out Fraud", Retail Banker International, Jul. 24, 2007, pp. 4.

Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
"The Best of the Best," Mortgage Technology, Nov. 1, 2003, vol. 10, No. 8, pp. 34-53.
Thomas, David, "Report on Networks and Electronic Communications Newcourt Credit Turns to Extranet Services / A PC Connects To 1,200 Users At Once", The Globe and Mail (Canada), Section: Report on Business Special Report, Nov. 12, 1996, pp. 2.
Vamosi, Robert, "How to Handle ID Fraud's Youngest Victims," Nov. 21, 2008, http://news.cnetcom/8301-10789_3-10105303-57.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Universiteit Gent (Belgium) 2005.
Washington State Office of Public Defense, "Criteria and Standards for Determining and Verifying Indigency," dated Feb. 9, 2001.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
West, David, "Neural Network Credit Scoring Models", Computers & Operations Research, vol. 27, 2000, pp. 1131-1152.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Zoot—Decision Engine, www.zootweb.com/decision_engine.html, as printed on Mar. 3, 2008.
Zoot—Instant Rules Gui, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
Zoot—Zoot's Hosted Environment, http://www.zootweb.com/zootasp.html as printed Mar. 3, 2008.
Application as filed in U.S. Appl. No. 10/452,155, dated May 30, 2003.
Preliminary Amendment in U.S. Appl. No. 10/452,155, dated Sep. 15, 2003.
Office Action in U.S. Appl. No. 10/452,155, dated Jan. 25, 2008.
Examiner Interview Summary in U.S. Appl. No. 10/452,155, dated Jul. 23, 2008.
Response to Office Action in U.S. Appl. No. 10/452,155, dated Jul. 25, 2008.

(56) References Cited

OTHER PUBLICATIONS

Office Action in U.S. Appl. No. 10/452,155, dated Oct. 2, 2008.
Examiner Interview Summary in U.S. Appl. No. 10/452,155, dated Jan. 14, 2009.
Response to Office Action in U.S. Appl. No. 10/452,155, dated Apr. 2, 2009.
International Preliminary Report on Patentability and Written Opinion for Application No. PCT/US2005/041814, dated Dec. 27, 2007.
International Search Report and Written Opinion for Application No. PCT/US2007/06070, dated Nov. 10, 2008.
Application as filed in U.S. Appl. No. 09/790,453, dated Feb. 22, 2001.
Office Action in U.S. Appl. No. 09/790,453, dated Jan. 20, 2006.
Response to Office Action in U.S. Appl. No. 09/790,453, dated Apr. 20, 2006.
Office Action in U.S. Appl. No. 09/790,453, dated Jul. 11, 2006.
Response to Office Action in U.S. Appl. No. 09/790,453, dated Sep. 8, 2006.
Office Action in U.S. Appl. No. 09/790,453, dated Dec. 1, 2006.
Response to Office Action in U.S. Appl. No. 09/790,453, dated Mar. 1, 2007.
Office Action in U.S. Appl. No. 09/790,453, dated May 10, 2007.
Response to Office Action in U.S. Appl. No. 09/790,453, dated Nov. 8, 2007.
Response to Advisory Action in U.S. Appl. No. 09/790,453, dated Jan. 3, 2008.
Office Action in U.S. Appl. No. 09/790,453, dated Mar. 21, 2008.
Response to Office Action in U.S. Appl. No. 09/790,453, dated Jun. 3, 2008.
Application as filed in U.S. Appl. No. 10/183,135, filed Jun. 25, 2002.
Office Action in U.S. Appl. No. 10/183,135, dated Oct. 22, 2007.
Response to Office Action in U.S. Appl. No. 10/183,135, dated Jan. 22, 2008.
Final Office Action in U.S. Appl. No. 10/183,135, dated Apr. 14, 2008.
Response to Office Action in U.S. Appl. No. 10/183,135, dated Jun. 11, 2008.
Office Action in U.S. Appl. No. 10/183,135, dated Aug. 21, 2008.
Response to Office Action in U.S. Appl. No. 10/183,135, dated Dec. 22, 2008.
Office Action in U.S. Appl. No. 10/183,135, dated Feb. 26, 2009.
Office Action in U.S. Appl. No. 11/169,769, dated Mar. 24, 2010.
Application as Filed in U.S. Appl. No. 11/363,984, dated Feb. 27, 2006.
Office Action in in U.S. Appl. No. 11/363,984, dated Dec. 26, 2008.
International Search Report and Written Opinion for Application No. PCT/US2007/063822, dated Sep. 11, 2007.
International Search Report and Written Opinion for Application No. PCT/US2007/063823, dated Oct. 24, 2007.
International Search Report and Written Opinion for Application No. PCT/US2007/063824, dated Oct. 3, 2007.
International Search Report and Written Opinion for Application No. PCT/US2008/055919, dated Jul. 28, 2008.
"A New Approach to Fraud Solutions", BasePoint Science Solving Fraud, pp. 8, 2006.
Abrahams, Steven W., "The New View in Mortgage Prepayments: Insight from Analysis at the Loan-By-Loan Level," The Journal of Fixed Income, Jun. 1997, vol. 7, No. 1, pp. 8-21.
Agreement Between Dallas Computer Services, dba DCS Information Systems and the Texas Department of Human Services, to Provide Data Brokering Services, Contract #324Z-8-05203 signed Jun. 15, 1998 and including corresponding documents in 38 pages. [Search America—Exhibit 1010].
Bancroft, John, "Tools Help Managers with Risk Management," Real Estate Finance Today, May 26, 1997, pp. 11-12.
"Bank of America Direct Web-Based Network Adds Core Functionality To Meet Day-To-Day Treasury Needs", Business Wire, Oct. 25, 1999. pp. 2.

Barone, Robert P., "The Integrated Approach to Branch Service Delivery," American Banker, Aug. 6, 1991, http://www.highbeam.com/doc/1G1-11128400.html.
"Beverly Hills Man Convicted of Operating 'Bust-Out' Schemes that Caused More than $8 Million in Losses", Department of Justice, Jul. 25, 2006, 2 Pgs.
Brown et al., "ALCOD IDSS:Assisting the Australian Stock Market Surveillance Team's Review Process," Applied Artificial Intelligence Journal, Dec. 1, 1996, pp. 625-641.
"Bust-Out Schemes", Visual Analytics Inc. Technical Product Support, Newsletter vol. 4, Issue 1, Jan. 2005, pp. 7.
Butkus, Charles, "System Cuts Medicaid Processing to 11 Cents a Claim", ComputerWorld, May 21, 1975, pp. 51 and 53.
"Charity Care Policy and Procedure", Report to the Community for the Year 2002, John T. Mather Memorial Hospital, Port Jefferson, NY, 2002.
"Chase Gets Positive," Bank Technology News, May 6, 2000, vol. 14, No. 5, p. 33.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
Compliance Data Systems, Inc. T-PASS Catalogue Profile, Sep. 8, 1994, available at http://www.compliancedata.com/catalogue.html.
Curriculum Vitae of Kenneth A. Zeger dated Jan. 8, 2013 in 20 pages.
Dash, Julekha, "Java on the Street," Software Magazine, Oct. 1, 1997, vol. 17, No. 11, p. 2.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsolidationcare.com/debt-settlement.html printed Jan. 9, 2013 in 6 pages.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Ecredable: Discover your AMP Credit Rating™, http://www.ecredable.com/how-it-works/amp-credit-rating printed Oct. 12, 2012 in 2 pages.
"Enterprise Technology Management Architecture", Texas Department of Human Services, Version 1.0, Aug. 31, 1999, pp. 22.
Equifax: Consumer Bureau, http://www.equifax.co.In/financial-services/consumer_bureau/en_in#RiskScore printed Oct. 12, 2012 in 3 pages.
Experian, http://www.experian.com/ printed Oct. 12, 2012 in 1 page.
"Experian Launches Portfolio Monitor—Owner NoticesSM", News Release, Feb. 2003, Costa Mesa, CA.
"Factual Data Corp. Completes First Interface with Automated Underwriting System for Subprime Lenders", PR Newswire, Loveland, CO, Jan. 17, 2000.
Fair Isaac Corporation, myFICO: Products:Suze Orman's FICO® Kit Platinum: Your FICO Score, as printed Jun. 7, 2005 in 1 page, http://www.myfico.com/Products/FICOKit/Sample01.html.

(56) References Cited

OTHER PUBLICATIONS

Fair Isaac Corporation, myFICO: Sample: FICO Score Simulator, as printed Jun. 8, 2005 in 5 pages, http://www.rnyfico.com/Content/Samples/Sample_ScoreSimulator.asp.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: Fico Score Simulator: Pay Your Bills on Time, as printed Jun. 8, 2005 in 2 pages, http://www.myfico.com/Content/Samples/Sample_ScoreSimulator-Results.asp?select1=1&Simulation=1&ReportID=1&ProductID=&PayBillsOnTime.x=93 &PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A-3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulator-Results.asp?textfield222-5000&Simulation=6&ReportID-1&ProductID-8(TransferBalance.x=86&TransferBalance.y=24.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID-167100405, Aug. 2, 2005.
Financial Engines, http://corp.financialengines.com/ printed Oct. 12, 2012 in 1 page.
Frank, John, "Scoring Takes on a New Meaning," Credit Card Management, Sep. 1996, vol. 9, No. 6, pp. 155-159.
"Fraud Alert Learn How". Fight Identity Theft. http://www.fightidentitytheft.com/flag.html, accessed on Nov. 5, 2009.
Frohlich, Robert M., Jr., "Credit Scoring in a Hospital Setting", University of North Florida Thesis, Paper 97, Apr. 1997, pp. 82.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gilje, Shelby, "Keeping Tabs On Businesses That Keep Tabs On Us", NewsRoom, The Seattle Times, Section: SCENE, Apr. 19, 1995, pp. 4.
"Green Tree Investors May Go To Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Healy, Thomas J., "The New Science of Borrower Behavior," Mortgage Banking, vol. 58, No. 5, pp. 26-35, Feb. 1, 1998.
"HelpWorks Family of Products Offers Solutions for Providers of Social Services", Software Announcement, Letter No. 297-476, Nov. 11, 1997, http://www.www-304.ibm.com/jct01003c/cgi-bin/common/ssi/ssialias?infotype-an&subtype-ca&htmlfid=897/ENUS297-476&appname=xldata&language-enus.
"HelpWorks: One-Stop Screening for the Benefits Your Clients Need", Peter Martin Associates, Inc. website, HelpWorks description, Jul. 11, 2000, http://web.archive.org/web/20000711013829/http://www.petermartin.com/Products/HelpWorks/hw_info 02.html.

Hill, Kerry, "Identity Theft Your Social Security Number Provides Avenue For Thieves", NewsRoom, Wisconsin State Journal, Sep. 13, 1998, pp. 4.
"Implementation Advance Planning Document", Implementation Advance Planning Document, TIERS, Texas Department of Human Services, Eric M. Bost, Commissioner, May 2000, pp. 128.
Income and Eligibility Verification System (IEVS), Medi-Cal Eligibility Procedures Manual, Apr. 2000, pp. 164.
Jones, Sandra, "Small Software Firm Aiming for Internet", ChicagoBusiness.com, Mar. 13, 2000.
Kulkosky, Edward, "Credit Scoring Appeal Transcends Underwriting," American Banker, vol. 161, No. 93, p. 8, May 15, 1996.
Lan, Joe, "The Top Portfolio Management Software," http://www.aaii.com/computerizedinvesting/article/the-top-portfolio-management-software, Includes Discussion thread, Fourth Quarter 2011, pp. 17.
Langer et al., "Creditor List Screening Practices: Certain Implications Under the Fair Credit Reporting Act and the Equal Credit Opportunity Act," The Business Lawyer, May 1988, vol. 43, pp. 1123-1141.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock, "Personal Identity Theft Protection & Identity Theft Products," http://www.lifelock.com/lifelock-for-people, accessed Nov. 5, 2007.
LifeLock, Various Pages, www.lifelock.com/, 2007.
Longo, Tracey, "Managing Money: Your Family Finances", Kiplinger's Personal Finance Magazine, Jun. 1, 1995, vol. 49, No. 6, pp. 4.
Menge, Falko, "Enterprise Service Bus", Free and Open Source Software Conference, 2007, pp. 6.
Merriam Webster's Collegiate Dictionary, 10th Edition, 1999, p. 79.
Montgomery County Housing Report, Residential Market Report, Jan. 2004 in 6 pages.
Mowll, Charles, "Setting a Credit Policy for Patient Accounts", Healthcare Financial Management, Jan. 1989, pp. 3.
Mowll, Charles, "Knowing How and When to Grant Credit Healthcare Organizations", Healthcare Financial Management, Feb. 1989, pp. 4.
MyFico, http://www.myfico.com/products/ficoone/sample/sample_scoresimulator.aspx printed Oct. 12, 2012 in 3 pages.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Network Sciences Website, Community Health and Social Services Information System (CHASSIS) and Medicaider software by Network Sciences, LLC, on sale and/or in public use in or around 2000, http://www.netsci.net/index.asp.

(56) References Cited

OTHER PUBLICATIONS

"New Privista Product Provides Early Warning System to Combat Identity Theft", PR Newswire, Oct. 24, 2000, PR Newswire Association, Inc., New York.
"NewsHound: NewsHound User Guide Internet E-Mail", of record as early as May 2, 1997, pp. 11.
*Newsom v. Vanderbilt University et al.,* Opinion, 453 F.Supp. 401 (1978), Jun. 1, 1978, pp. 24.
"New for Investors: Asset Allocation, Seasoned Returns and More," Prosper, http://blog.prosper.com/2011/10/27/new-for-investors-asset-allocation-seasoned-returns-and-more/, pp. 4.
Novack, Janet, "The Coming Fight over FICO," Forbes, Dec. 18, 1995, vol. 156, No. 14, p. 96.
"Patients May be Frauds", The Victoria Advocate, Victoria, Texas, 138th Year-No. 194, p. 10A, Nov. 17, 1983.
PC411, Inc. "Reverse Searching Now Available on PC411," http://web.archive.org/web/19961103061843/http://www.pc411.com/PR_Revrs.html Apr. 9, 1996 in 2 pages.
"Peter Martin Releases HelpWorks Web Edition", Business Wire, Chicago, Sep. 28, 1999.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Ratner, Juliana, "GMAC to Sell Risk-Management Advice; Target is 150 Biggest Home Loan Servicers," American Banker, vol. 161, No. 53, p. 16, Mar. 19, 1996.
"Resolve Debt for Less: With Help from Freedom Financial" http://www.debtsettlementusa.com/ printed Jan. 9, 2013 in 6 pages.
"Response Automated Decision Systems", responsecorp.com, Inc., Press Release, Ft. Lauderdale, FL, Jun. 22, 2000, http://web.archive.org/web/20010420061717/http://www.responsecorp.com/news.html.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+ON+PORTFOLIO+RISK-a018092212.
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
Sear, Alan M., Ph.D., "An Expert System for Determining Medicaid Eligibility", Journal of Medical Systems, Oct. 1988, vol. 12, Issue 5, pp. 275-283.
*Search America, Inc. v. TransUnion Intelligence LLC,* Declaration of Kenneth Zeger in re: U.S. Pat. No. 7,333,937, Signed Jul. 24, 2013, pp. 9.
*Search America, Inc. v. TransUnion Intelligence LLC,* Decision, Case No. CBM2013-00038, U.S. Pat. No. 7,333,937, Feb. 7, 2014, pp. 24.
*Search America, Inc. v. TransUnion Intelligence LLC,* Declaration of Kenneth Zeger in re: U.S. Pat. No. 8,185,408, Signed Jul. 29, 2013, pp. 9.
*Search America, Inc. v. TransUnion Intelligence LLC,* Patent Owner Transunion Intelligence, LLC's Preliminary Response, Case No. CBM2013-00037, U.S. Pat. No. 7,333,937, Nov. 11, 2013, pp. 28.
*Search America, Inc. v. TransUnion Intelligence LLC,* Patent Owner Transunion Intelligence, LLC's Preliminary Response, Case No. CBM2013-00038, U.S. Pat. No. 8,185,408, Nov. 11, 2013, pp. 26.
*Search America, Inc. v. TransUnion Intelligence LLC,* Decision, Case No. CBM2013-00038, U.S. Pat. No. 8,185,408, Feb. 7, 2014, pp. 22.
*Search America, Inc. v. TransUnion Intelligence LLC,* Petition for Covered Business Method Patent Review Under 35 U.S.C. §§ 321 and Section 18 of the Leahy-Smith America Invents Act, U.S. Pat. No. 8,185,408, Jul. 29, 2013, pp. 84.
*Search America, Inc. v. TransUnion Intelligence LLC,* Petition for Covered Business Method Patent Review Under 35 U.S.C. §§ 321 and Section 18 of the Leahy-Smith America Invents Act, Case No. U.S. Pat. No. 7,333,937, Jul. 29, 2013, pp. 88.
*Search America, Inc. v. TransUnion Intelligence LLC,* Scheduling Order, Case No. CBM2013-00037, U.S. Pat. No. 7,333,937, Feb. 7, 2014, pp. 7.
*Search America, Inc. v. TransUnion Intelligence LLC,* Scheduling Order, Case No. CBM2013-00038, U.S. Pat. No. 8,185,408, Feb. 7, 2014, pp. 6.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
Steele, Georgia, "Fair, Isaac Seeks Mortgage Tech Opportunities," National Mortgage News, Special Report; B& C Lending, Mar. 23, 1998, p. 34.
Sullivan, Deidre, "Scoring Borrower Risk," Mortgage Banking, Nov. 1994, vol. 55, No. 2, pp. 94-98.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, Pgs. 4, [Originally Published in Retail Banker International Magazine Jul. 24, 2007].
Taylor, Marshall, "Loan-Level Pricing Draws Interest From Investors," Real Estate Finance Today, Jul. 7, 1997, vol. 14, No. 14. p. 10.
Technical Architecture Framework, TIERS, May 8, 2000, pp. 67.
Texas Comptroller of Public Accounts, Texas Performance Review, "Against the Grain: vol. 2," 1993, as printed Dec. 14, 2012 in 7 pages, from http://www.window.texas.gov/tpr/atg/atg/atgtoc.html.
Texas Comptroller of Public Accounts, Texas Performance Review, "Gaining Ground: vol. 2," 1994, as printed Dec. 14, 2012 in 4 pages, from http://www.window.texas.gov/tpr/tprgg/v2home.html.
Texas Department of Human Services, Revision Notice, Revision 99-1, Effective: Jan. 1, 1999, dated Dec. 11, 1998, pp. 11.
Texas Department of Human Services, Revision Notice, Revision 99-3, Effective: Jul. 1, 1999, dated May 28, 1999, pp. 11.
Texas Department of Human Services, Revision Notice, Revision 99-6, Effective: Oct. 1, 1999, dated Sep. 3, 1999, pp. 20.
Texas Department of Human Services, Revision Notice, Revision 00-3, Effective: Apr. 1, 2000, dated Mar. 3, 2000, pp. 17.
Texas Department of Human Services, Oig, 3000—Case Development, Jan. 1999, pp. 3.
Texas Department of Human Services, System Specifications, Section 3.2, Current System Architecture and Functional Specifications, NOA Assembled, pp. 21, as last modified Jul. 4, 2000.
Texas Department of Human Services, System Specifications, Section 3.3, Current System Architecture and Functional Specifications, GWS Assembled, pp. 752, as last modified Jul. 4, 2000.
Texas Department of Human Services, System Specifications, Section 3.3, Current System Architecture and Functional Specifications, GWS Assembled, pp. 754, as last modified Jul. 4, 2000.
Texas Department of Human Services, System Specifications, Section 3.3.1, TESS System, pp. 47, as last modified Jul. 4, 2000.
Texas Department of Human Services, System Specifications, Section 3.4, Current System Architecture and Functional Specifications, LTCMED Assembled, pp. 372, as last modified Jul. 4, 2000.
Texas Department of Human Services, System Specifications, Section 3.5, Current System Architecture and Functional Specifications, SAVERR FS Assembled, pp. 141, as last modified Jul. 4, 2000.
Texas Department of Human Services, System Specifications, Section 3.6, SAVERR TANF Assembled, pp. 219., as last modified Jul. 4, 2000.

(56) References Cited

OTHER PUBLICATIONS

Texas Department of Human Services, System Specifications, Section 3.7, Current System Architecture and Functional Specifications, SAVERR INTER/MED, pp. 838, as last modified Jul. 5, 2000.
Texas Department of Human Services, System Specifications, Section 3.8, Current System Architecture and Functional Specifications, pp. 172, as last modified Jul. 4, 2000.
TheMorningCall.Com, "Cheap Ways to Foil Identity Theft," www.mcall.com/business/columnists/all-karp.5920748jul01,0 . . . , published Jul. 1, 2007.
"Third Party Assistance Software System (T-PASS)", Compliance Data Systems, Inc. website, T-PASS Information Page, Oct. 1, 1998, available at http://web.archive.org/web/20010308232545/http://compliancedata.com/tpass.html#Profile.
"TIERS Procurement Information," Texas Department of Human Services, as captured May 26, 2000 http://web.archive.org/web/20000526131749/http://www.dhs.state.tx.us/prog rams/TIERS/procurement. html in 3 pages.
Todorova, Aleksandra, "Protecting Your Child's Identity", Smart Money, Published Aug. 2, 2007, pp. 1-5.
TRAkkER Corporation website, trakkercorp.com, TRAkkER Software Description, May 26, 2000, available at http://web.archive.org/web/20000526234204/http://trakkercorp.com/page4.html.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
*TransUnion Intelligence LLC* v. *Search America, Inc.,* Videotape Deposition of James Sunyar, Nov. 12, 2012, Case No. 0:11-CV-01075-EJS-FLN, pp. 128.
*TransUnion Intelligence LLC* v. *Search America, Inc.,* Oral and Videotape Deposition of Bobby Keith Graves, Oct. 26, 2012, Case No. 0:11-CV-01075-PJS-FLN, pp. 181.
*TransUnion Intelligence LLC* v. *Search America, Inc.,* Oral and Videotape Deposition of Kerby Spruiell, May 13, 2013, Case No. 0:11-CV-01075, pp. 257.
*TransUnion Intelligence LLC* v. *Search America, Inc.,* Videotape Deposition of Jodi Halpine, Oct. 16, 2012, Case No. 0:11-CV-01075-EJS-FLN, pp. 176.
TransUnion: VantageScore®—Consistency in Credit Scoring, http://www.transunion.com/personal-credit/credit-reports/vantage-score. p. printed Oct. 12, 2012 in 2 pages.
Trulia, "Trulia Estimates," http://www.trulia.com/trulia_estimates/, printed Feb. 18, 2014 in 2 pages.
Tuman, Diane, "What is a Zestimate?" Mar. 2013, pp. 5, http://www.zillow.com/wikipages/What-is-a-Zestimate/.
*United States of America* v. *Patricia Lahaie Mahaney,* Government's Response to the Standing Discovery Order, Case:0:03-CR-60022-JIC, Entered into docket Jun. 17, 2003, pp. 16.
"Use of Alternative Data to Enhance Credit Reporting to Enable Access to Digital Financial Services by Individuals and SMEs Operating in the Informal Economy", Guidance Note, International Committee on Credit Reporting (ICCR), Jun. 28, 2018, pp. 35.

Wahl, Martin, "The Stampede to Subprime," Mortgage Banking, Oct. 1, 1997, vol. 58, No. 1, p. 26(7).
Washington Automated Client Eligibility System (ACES), 1996, pp. 13.
"We Eliminate Bad Debt", as printed from http://www.webcreditbureau.com/start/, dated Aug. 22, 2012, 1 Page.
Wilson, Andrea, "Escaping the Alcatraz of Collections and Charge-Offs", http://www.transactionworld.net/articles/2003/october/riskMgmt1.asp, Oct. 2003.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Yang, et al., "An Analysis of the Ex Ante Probabilities of Mortgage Prepayment and Default", Real Estate Economics, Dec. 1998, vol. 26, No. 4, pp. 651-676.
Examiner Interview Summary in U.S. Appl. No. 10/452,155, dated Jul. 21, 2009.
Notice of Allowance in U.S. Appl. No. 10/452,155, dated Aug. 19, 2009.
International Search Report for Application No. PCT/US2005/041814, dated Aug. 29, 2007.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion for Application No. PCT/US2018/016258, dated May 16, 2018.
International Preliminary Report on Patentability in Application No. PCT/US2018/016258, dated Aug. 15, 2019.
International Search Report and Written Opinion for Application No. PCT/US2018/061877, dated Mar. 8, 2019.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.
Office Action in U.S. Appl. No. 10/183,135, dated Aug. 18, 2009.
Office Action in U.S. Appl. No. 10/183,135, dated Feb. 19, 2010.
Final Office Action in U.S. Appl. No. 10/183,135, dated Sep. 22, 2010.
Office Action in U.S. Appl. No. 10/183,135, dated Mar. 25, 2011.
Notice of Allowance in U.S. Appl. No. 10/183,135, dated Aug. 15, 2011.
International Preliminary Report on Patentability in Application No. PCT/US2018/061877, dated Jun. 4, 2020.
International Search Report and Written Opinion for Application No. PCT/US2019/049377, dated Dec. 20, 2019.
*TransUnion Intelligence LLC* v. *Search America, Inc.,* Jury Trial Demand, Non-Confidential Redacted Version, Case No. 0:11-CV-01075-EJS-FLN, Nov. 16, 2012, pp. 42.
*TransUnion Intelligence LLC* v. *Search America, Inc.,* Jury Trial Demand, Case No. 0:11-Cv-01075-PJS-FLN, Nov. 13, 2012, pp. 18.

\* cited by examiner

SYSTEMS AND METHODS FOR ANALYZING DATA

CROSS-REFERENCE TO RELATED APPLICATIONS

This application is a divisional of U.S. patent application Ser. No. 13/555,982, filed on Jul. 23, 2012 and entitled "SYSTEMS AND METHODS FOR ANALYZING DATA," which is a continuation of U.S. patent application Ser. No. 12/338,871, filed on Dec. 18, 2008 and entitled "SYSTEMS AND METHODS FOR ANALYZING DATA," which is a divisional of U.S. patent application Ser. No. 11/535,907, filed on Sep. 27, 2006 and entitled "SYSTEMS AND METHODS FOR ANALYZING DATA," which claims priority to U.S. Provisional Application Ser. No. 60/781,391, filed on Mar. 10, 2006, each of which is hereby expressly incorporated by reference in their entirety.

BACKGROUND OF THE INVENTION

Field of the Invention

This invention is related to analysis of data related to a plurality of individuals in order to categorize the individuals. More particularly, the invention is related to analysis of financial and demographic information of individuals in order to categorize the individuals, assign risks for future delinquencies to the individuals, and return reasons for assignment of a particular risk to an individual.

Description of the Related Art

Lending institutions provide credit accounts such as mortgages, automobile loans, credit card accounts, and the like, to consumers. Prior to providing an account to an application, or applicants, however, many of these institutions review credit related data and demographic data associated with the applicant in order to determine a risk of the applicant defaulting on the account or filing for bankruptcy, for example. Such credit and demographic data may be used to categorized, or segment, individuals into one of a plurality of segments where each segment is associated with other individuals that each have certain similar attributes. Scoring models that may be particular to the assigned segment may then be applied to the individual in order to determine a risk score that is used by the lending institution to assess a risk level associated with the applicant.

SUMMARY

In one embodiment, information regarding individuals that fit a bad performance definition, such as individuals that have previously defaulted on a financial instrument or have declared bankruptcy, is used to develop a model that is usable to determine whether an individual that does not fit the bad performance definition is more likely to subsequently default on a financial instrument or to declare bankruptcy. The model may be used to generate a score for each individual, and the score may be used to segment the individual into a segment of a segmentation structure that includes individuals with related characteristics, where segments may include different models for generating a final risk score for the individuals assigned to the particular segments. Thus, the segment to which an individual is assigned, which may be determined based at least partly on the score assigned to the individual, may affect the final risk score that is assigned to the individual.

In another embodiment, a method of generating a default/bankruptcy model for assigning an individual to particular segments of a segmentation structure, wherein the default/bankruptcy model is indicative of an individual's propensity to either default on one or more financial instruments or file for bankruptcy comprises, receiving observation data comprising financial and demographic information regarding a plurality of individuals, the observation data indicating characteristics of the individuals at an observation time, receiving outcome data comprising financial and demographic information regarding the plurality of individuals fitting a bad performance definition, the outcome data indicating characteristics of the individuals fitting the bad performance definition during an outcome period, the outcome period beginning after the observation time, and comparing the observation data and the outcome data in order to generate the bankruptcy/default model usable to determine which of a plurality of segments in the segmentation structure a particular individual should be assigned.

In another embodiment, a method of assessing a risk associated with an individual comprises generating a model based on data regarding a first subgroup of a population, the subgroup comprising a first portion fitting a first failure definition and a second portion fitting a second failure definition, and applying the generated model to the individual, wherein the individual is not a member of the first subgroup.

In another embodiment, a computing system for segmenting each of a plurality of individuals into one of a plurality of segments of a segmentation structure comprises a profile module configured to generate a default/bankruptcy model for assigning each individual to one or more segments of the segmentation structure, wherein the default/bankruptcy model is indicative of an individual's propensity to either default on one or more financial instruments or to file for bankruptcy, and a segmentation module configured to segment each of the individuals using the default/bankruptcy model, wherein the individuals include individuals satisfying a bad performance definition and individuals satisfying a good performance definition.

In another embodiment, a method for selecting one or more adverse action codes to associate with a final risk score assigned to an individual, each of the adverse action codes indicating a reason that the final risk score was assigned to the individual, wherein the individual is assigned to a segmentation hierarchy comprising a plurality of segments, including a final segment, in a segmentation structure comprises determining a first penalty associated with assignment of the individual to a final segment, determining a first ratio of the first penalty to a difference between a highest possible final risk score and the final risk score for the individual, if the determined first ratio is above a first determined threshold, allotting an adverse action code related to assignment of the individual to the final segment.

In another embodiment, a method of generating a model for determining an individual's propensity to enter either a first failure mode or a second failure mode comprises defining a bad performance definition to include individuals that have characteristics of one or more of the first and second failure modes, receiving observation data regarding a plurality of individuals fitting the bad performance definitions, the observation data indicating characteristics of the individuals at an observation time, receiving outcome data regarding the plurality of individuals fitting the bad performance definition, the outcome data indicating characteristics of the individuals fitting the bad performance definition during an outcome period, the outcome period beginning after the observation time, and comparing the observation data and the outcome data in order to generate a model usable to determine a likelihood that an individual not fitting the bad performance definition will enter a first failure mode or if the individual will enter the second failure mode.

DETAILED DESCRIPTION OF CERTAIN EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

Figure 1:
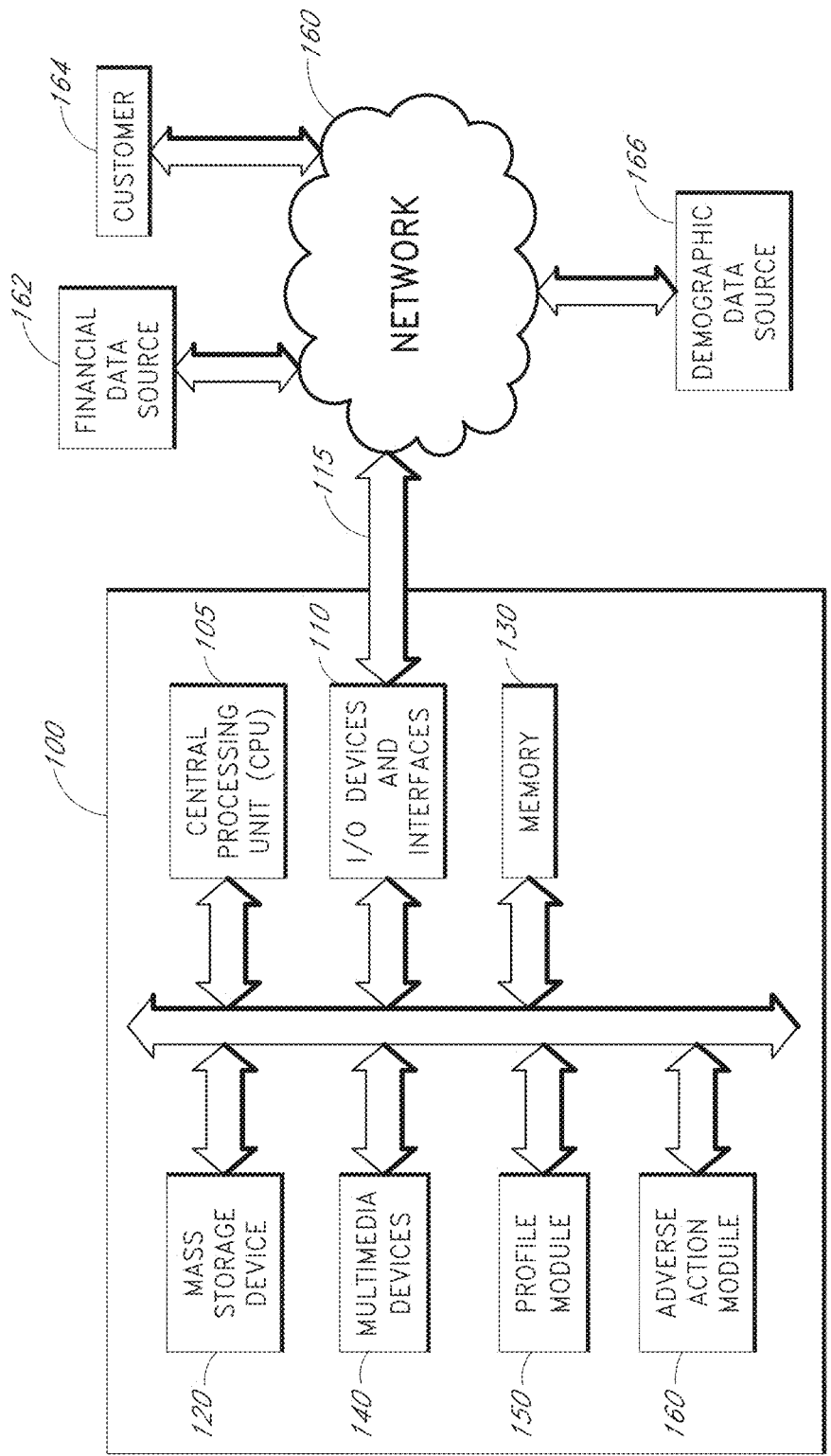
FIG. 1 is one embodiment of a block diagram of a computing system that is in communication with a network and various devices that are also in communication with the network.

FIG. 1 is one embodiment of a block diagram of a computing system 100 that is in communication with a network 160 and various devices that are also in communication with the network 160. The computing system 100 may be used to implement certain systems and methods described herein. For example, in one embodiment the computing system 100 may be configured to receive financial and demographic information regarding individuals and generate risk scores for the individuals. The functionality provided for in the components and modules of computing system 100 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The computing system 100 includes, for example, a personal computer that is IBM, Macintosh, or Linux/Unix compatible. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 is generally controlled and coordinated by operating system software, such as the Windows 95, 98, NT, 2000, XP, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is coupled to a network 160, such as a LAN, WAN, or the Internet, for example, via a wired, wireless, or combination of wired and wireless, communication link 115. The network 160 communicates with various computing devices and/or other electronic devices via wired or wireless communication links. In the exemplary embodiment of FIG. 1, the network 160 is coupled to a financial data source 162, such as a bank or other financial institution, a demographic data source 166, such as a government public information database, and a customer 164, such as a financial institution that is interested in the financial risks associated with particular individual. The information supplied by the various data sources may include credit data, demographic data, application information, product terms, accounts receivable data, and financial statements, for example. In addition to the devices that are illustrated in FIG. 1, the network 160 may communicate with other data sources or other computing devices.

In the embodiment of FIG. 1, the computing system 100 also includes two application modules that may be executed by the CPU 105. In the embodiment of FIG. 1, the application modules include the profile module 150 and the adverse action module 160, which are discussed in further detail below. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiments described herein, the computing system 100 is configured to execute the profile module 150 and/or the adverse action module 160, among others, in order to provide risk information regarding certain individuals or entities. For example, in one embodiment the computing system 100 generates risk scores for individuals, where the risk scores indicate a financial risk associated with the individual. In one embodiment, the customer 164 is a financial institution interested in the risk of default or late payments on a loan or credit card account that has been applied for by an individual. Thus, the computing system 100 may be configured to analyze data related to the individual from various data sources in order to generate a risk score and provide the risk score to the customer 164. In one embodiment, multiple financial accounts, such as bank accounts, credit card accounts, and loan accounts, are associated with each individual. Thus, the computing system 100 analyzes data regarding multiple accounts of individuals and determines scores for the individuals that are usable by one or more customers. Various other types of scores, related to other types of risks, may also be generated by the computing system 100. Although the description provided herein refers to individuals, the term individual should be interpreted to include groups of individuals, such as, for example, married couples or domestic partners, and business entities.

Figure 7:
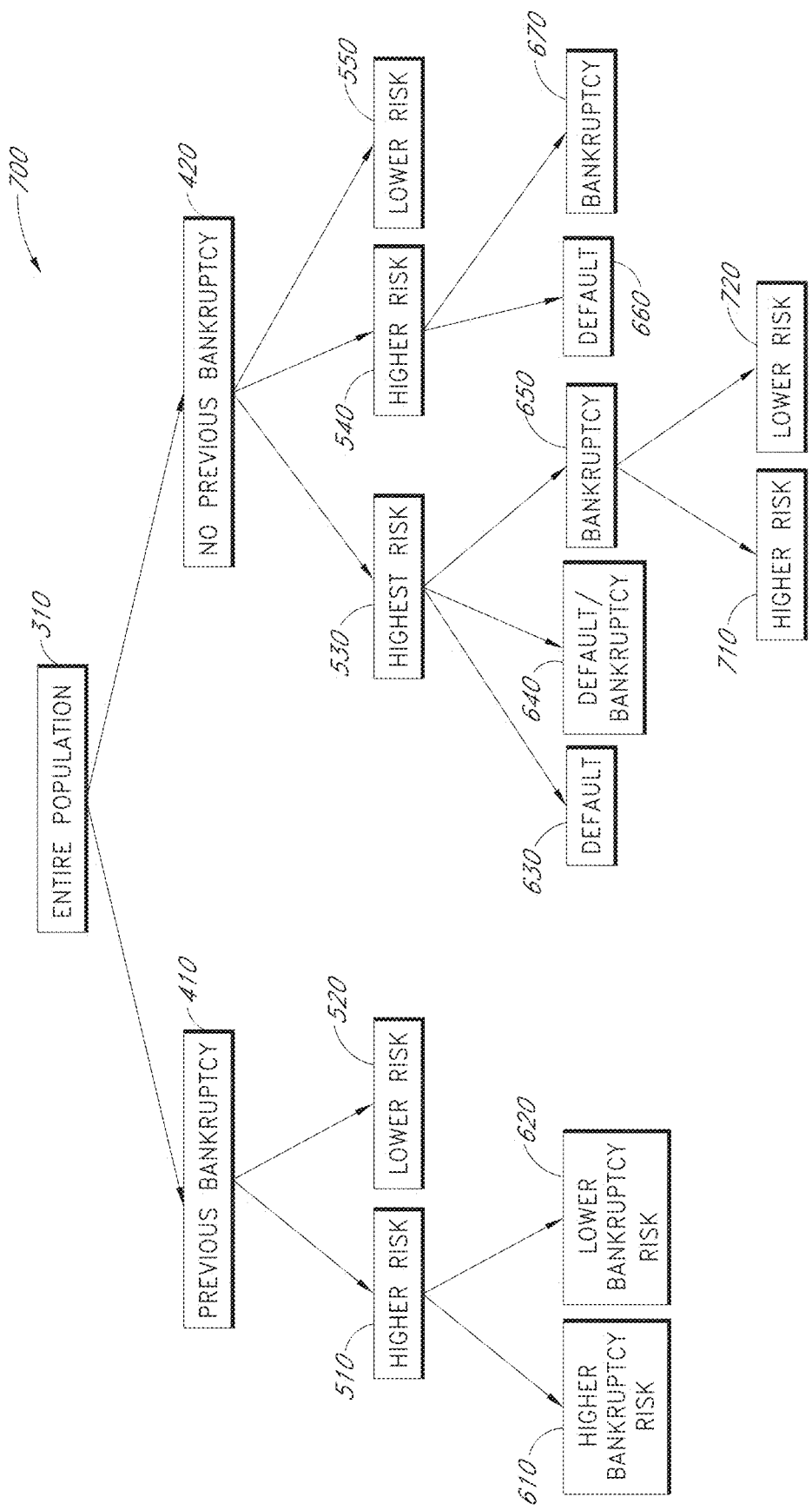
FIG. 7 illustrates one embodiment of a segmentation structure having five levels of segments.

In one embodiment, the computing system 100 executes the profile module 150, which is configured to analyze data received from one or more data sources and generate a profile model that is usable to assign individuals to groups. The groups to which individuals may be assigned may also be referred to as segments and the process of assigning accounts to particular segments may be referred to as segmentation. A segmentation structure may include multiple segments arranged in a tree configuration, wherein certain segments are parents, or children, of other segments. A segment hierarchy includes the segment to which an individual is assigned and each of the parent segments to the assigned segment. FIG. 7, described in detail below, illustrates a segmentation structure having multiple levels of segments to which individuals may be assigned. In one embodiment, the segments are each configured to be associated with individuals that each have certain similar attributes.

After assigning a score to an individual, the computing system 100 may also select and provide reasons related to why the individual was assigned a particular score. For example, many customers request information regarding the factors that had the most impact on an individual's risk score. Thus, in one embodiment the computing system 100 selects one or more adverse action codes that are indicative of reasons that a particular score was assigned to an individual. In certain embodiments, the assignment of an individual to a particular segment may be a factor that was relevant in arriving at the risk score for the individual. Thus, in one embodiment, one or more adverse action codes provided to a customer may be related to the assignment of the individual to a particular segment, or to particular segments in the segment hierarchy. In one embodiment, the adverse action module 160 is configured to determine how many, if any, of a determined number of total adverse action codes should be allotted to various segments of the individuals segment hierarchy. The adverse action module 160 may also determine which adverse action codes are returned. The operation of the profile module 150 and the adverse action module 160 are explained further below with respect to the drawings.

I. Segmentation

Figure 2:
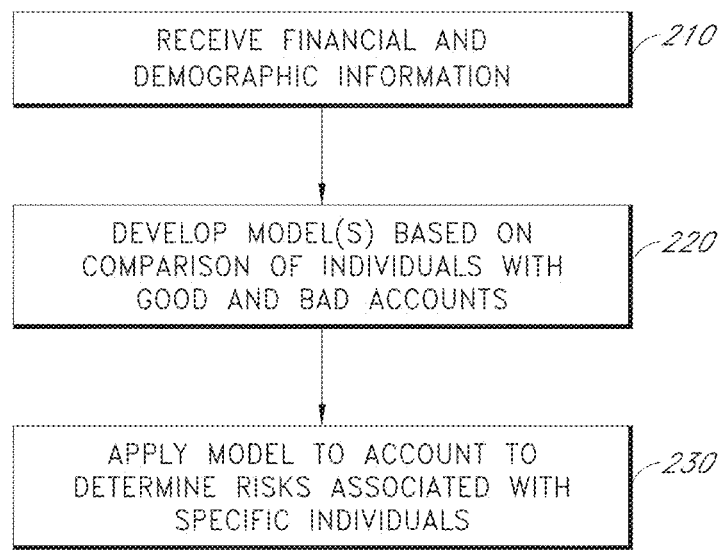
FIG. 2 is one embodiment of a flowchart illustrating an exemplary method of analyzing data to create a model.

FIG. 2 is one embodiment of a flowchart illustrating an exemplary method of analyzing data to create a model. The exemplary method of analyzing data may be stored as a process accessible by the profile module 120 and/or other components of the computing system 100. As described above, models may be created based on existing data in an attempt to predict characteristics of other related data. Depending on the embodiment, certain of the blocks described below may be removed, others may be added, and the sequence of the blocks may be altered.

Beginning in a block 210, financial and demographic information is received by a computing device, such as the computing device 100 of FIG. 1. The financial and demographic data may be received from various data sources, including those discussed above with reference to FIG. 1. In the embodiment of FIG. 2, financial and demographic information related to a plurality of individuals, and a plurality of financial accounts associated with the individuals, is obtained. Thus, for any given individual, data regarding characteristics of multiple financial accounts may be received. In addition, the received data may be a subset of the available data, such as, for example males older than 40, or a random 10% sample of the population. In an advantageous embodiment, the received data is in a format that is easily understood and usable by the computing system 100. It is recognized that in other embodiments, the data could be retrieved in block 210, such as, for example, by reading data stored on one or more data source via the network 160

Moving to a block 220, one or more models are developed based on a comparison of the received data. In the embodiment of FIG. 2, a model is generated by comparing characteristics of individuals that are classified as fitting either a good or a bad definition. In one embodiment, for example, a bad performance definition is associated with individuals having at least one account that has had a 90+ days past due status within the previous two years, for example, while the good performance definition is associated with individuals that have not had a 90+ days past due status on any accounts within the previous two years. It is recognized that in other scenarios, individuals with at least one account that is 90+ days past due may be classified as a good performance definition. As those of skill in the art will recognize, the specific criteria for being categorized in either the good or bad performance definitions may vary greatly and may consider any available data, such as data indicating previous bankruptcy, demographic data, and default accounts associated with an individual, for example.

Continuing to a block 230, the developed model is applied to an individual in order to determine risks associated with the individual. For example, the model may be used to determine if an individual is more closely related to the individuals associated with the good performance definition, or with individuals associated with the bad performance definition. Thus, application of the model on an individual may predict whether the individual will have past due account statuses in the future, for example. Accordingly, the generated model may be used by customers in order to determine what types of financial services should be offered to a particular individual, if any, and rates, such as interest rates, for the individual may be proportional to the risk score developed by application of the model to the individual.

Figure 2A:
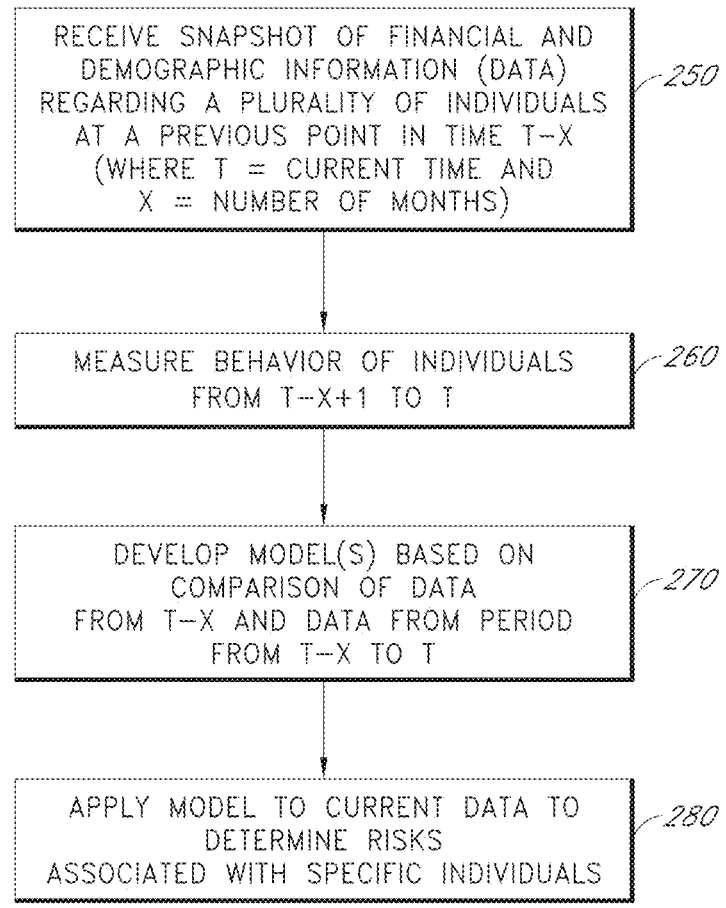
FIG. 2A is another embodiment of a flowchart illustrating an exemplary method of analyzing data from multiple points in time in order to create a model.

FIG. 2A is another embodiment of a flowchart illustrating an exemplary method of analyzing data from multiple points in time in order to create a model. In this embodiment, the model may be created based on analyzing data from a previous point in time (an observation point) in an attempt to predict known behavior as measured subsequent to the observation point (during an outcome period). More particularly, the model is generated by analysis of the data from the observation point, referred to as observation data, in context of the data from the outcome period, referred to as outcome data. Once generated, the model may be applied to individuals, based on the current data related to the individual at the time of applying the model. Depending on the embodiment, certain of the blocks described below may be removed, others may be added, and the sequence of the blocks may be altered.

Beginning in a block 250, a snapshot of financial and demographic information regarding a plurality of individuals at a particular point in time is received. In the embodiment of FIG. 2A, the observation point is some time previous to the current time and may be expressed generally as T−X, where T is the current time and X is a number of months. In one embodiment, T=the date the profile model is being generated. In this embodiment, if X=25, the observation point is 25 months previous to the date the profile model is being generated. In other embodiments, X may be set to any other time period, such as 6, 12, 18, 36, or 48, for example.

Continuing to a block 260, data related to individuals during a period subsequent and mutually exclusive to the observation point is obtained. In one embodiment, this outcome period may be defined generally as the period from T−X+1 to T, is obtained. Thus, in an exemplary embodiment where X=25, data from the individuals from 24 months previous until the date of model generation, is obtained. Behaviors measured for individuals during the outcome period may include, for example, repayment performance, bankruptcy filing, and response to a marketing offer. These behaviors may be referred to as the performance definition of the analysis.

Moving to a block 270, the observation data and the outcome data relative to the categories of the performance definition are analyzed in order to develop a model. Thus, data regarding the individuals at the snapshot date is compared to data regarding the individuals during the outcome period.

In a block 280, the model developed in block 270 may be applied to current data of an individual in order to predict future behavior or attributes of the individual over a time period. In one embodiment, the model is applied to a snapshot of the financial and demographic data related to the individual at the time of model application. Thus, the data used in applying the model may be predictive during any time after T, such as T+1, T+6, T+12, or T+24, for example. With respect to the example above, application of a model generated using X=25 may result in information that predicts an individual's behavior for a subsequent 24 month period.

As described in further detail below, generation of a model using data related to a certain subpopulation of all individuals received may advantageously be used to predict certain characteristics of even individuals outside the subpopulation used in development of the model. In particular, described below are exemplary systems and methods for generating a model for segmenting individuals based on whether the individual is more likely to default on one or more financial instruments, or whether the individual is more likely to file for bankruptcy. Thus, the model is generated by comparing individuals that are associated with default accounts and/or bankruptcy during the outcome period, which are each individuals classified in the bad performance definition. However, although the model is generated using only individuals that fit the bad performance definition, the generated model is used to segment individuals that do not fit the bad performance definition. For example, the model may be applied to individuals that are not associated with default accounts or bankruptcy observed during the outcome period. By applying a model generated from a first subgroup of a population (for example, bad performance definition individuals) to a second subgroup of the population (for example, any individuals, include good and bad performance definition individuals), certain attributes of the first subgroup are usable to predict risk characteristics of the second subgroup that may not be detectable using a traditional model.

Figure 3:
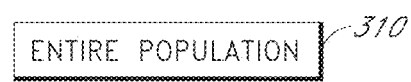
FIG. 3 illustrates one embodiment of a segmentation structure having a single segment.

FIGS. 3-7 are segmentation structures illustrating embodiments of levels of segments that may be included in a segmentation structures. The exemplary segmentation structure of FIG. 3 illustrates an embodiment of a first level of a segmentation structure, while the segmentation structures of FIGS. 3-7 each add an additional segmentation level to the segmentation structure. In one embodiment, the segmentation structures of FIGS. 3-7 may be based on observation data. The description of FIGS. 3-7 also describes exemplary steps of applying a model in order to segment an individual to a particular segment, and then to apply a model to the individual in order to determine an individual risk score. The segmentation structure discussed in these drawings provides one exemplary segmentation structure that may be use to categorize individuals. Thus, the segmentation structures described herein are not intended to limit the scope of segmentation structures that may be used in conjunction with the profile model generation and application systems and methods described herein.

FIG. 3 illustrates one embodiment of a segmentation structure having a single segment 310. In the embodiment of FIG. 3, all individuals are assigned to the segment 310. In one embodiment, segment 310 comprises a scoring model that may be applied to individuals within the segment in order to determine a preliminary risk score for the individuals. In one embodiment, because segment 310 includes all individuals, segment 310 may be considered a starting segment in which any individual is placed, rather than a segment 310 to which individuals may be assigned using one or more scoring criteria or attributes of the individuals.

Figure 4:
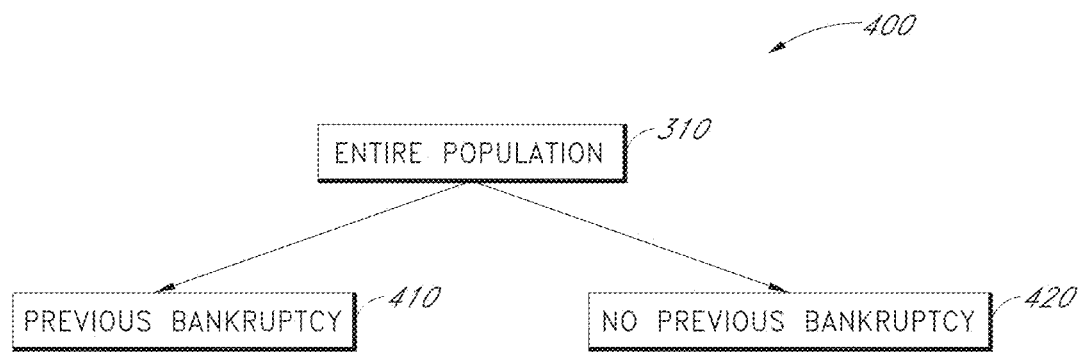
FIG. 4 illustrates one embodiment of a segmentation structure having two levels of segments.

FIG. 4 illustrates one embodiment of a segmentation structure having first and second levels of segments. More particularly, the segmentation structure 400 includes the first level segment 310 and two second level segments 410, 420 that are each connected as children nodes of the first level segment 310. In the embodiment of FIG. 4, segment 410 is associated with individuals that have one or more previous bankruptcies, while segment 420 is associated with individuals that have no previous bankruptcies. Thus, each individual in the entire population segment 310 may be assigned to one, and only one, of the second level segments 410, 420. More particularly, each individual either has a previous bankruptcy, or does not have a previous bankruptcy, and may therefore be assigned to exactly one of the second level segments 410 or 420. In other embodiments, some of the individuals may remain in the first level segment 310, while others are assigned to second level segments, such as segments 410, 420.

Figure 5:
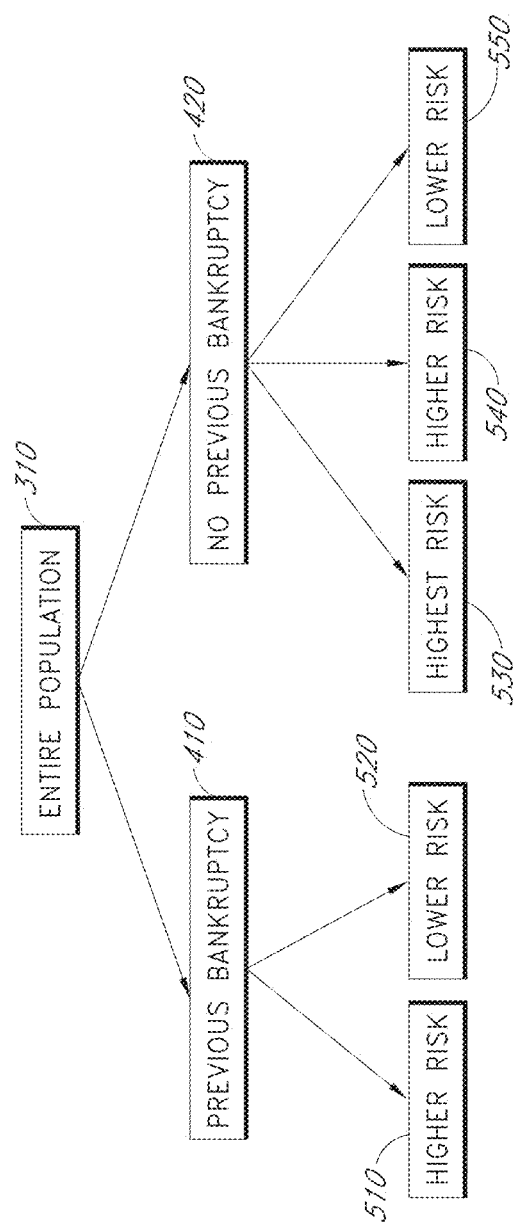
FIG. 5 illustrates one embodiment of a segmentation structure having three levels of segments.

FIG. 5 illustrates one embodiment of a segmentation structure having first, second, and third level segments. In the embodiment of FIG. 5, third level segments 510, 520 have been associated as children nodes of second level segment 410, and third level segments 530, 540, and 550 have been associated as children nodes of second-level segment 420. Thus, as illustrated in FIG. 5, individuals that are segmented to the previous bankruptcy segment 410 may be further segmented to either a higher risk segment 510 or a lower risk segment 520. Likewise, individuals that are segmented to the no previous bankruptcy segment 420 may be further segmented in either a highest risk segment 530, higher risk segment 540, or lower risk segment 550. Accordingly, the third level segments further divide and classify the individuals that are assigned to the second level segments. In one embodiment, assignment of individuals to one of the third level segments is determined according to a preliminary risk score for each particular count. The preliminary risk score may be determined based on a model that is developed for application to any individual in the entire population segment 310, based on certain attributes of each individual. In the embodiment of FIG. 5, the preliminary risk score is used in segmenting accounts into one of the third level segments, rather than directly as a factor in the model for determining a final risk score.

Figure 6:
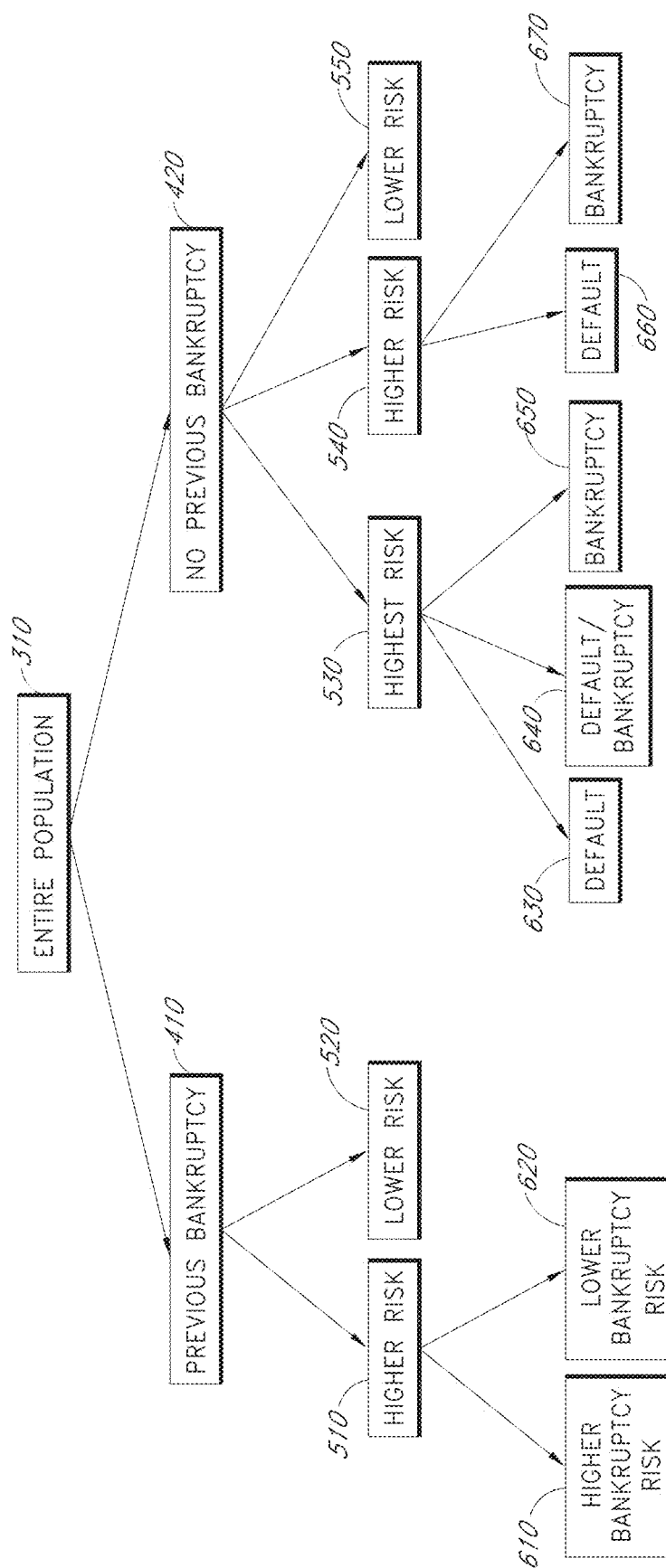
FIG. 6 illustrates one embodiment of a segmentation structure having four levels of segments.

FIG. 6 illustrates one embodiment of a segmentation structure having first, second, third, and fourth level segments. In the embodiment of FIG. 6, the third level higher risk segment 510 is further segmented into fourth level segments including a higher bankruptcy risk segment 610 and a lower bankruptcy risk segment 620. Similarly, the highest risk segment 530 is further segmented into a default segment 630, default/bankruptcy segment 640, and a bankruptcy segment 650. The higher risk segment 540 is further segmented into a default segment 660 and a bankruptcy segment 670. In an advantageous embodiment, a default/bankruptcy profile model is developed by analyzing individuals that are associated with a default account and/or bankruptcy during the outcome period. This default/bankruptcy profile model may then be applied to individuals within the higher risk segment 510, highest risk segment 530, or higher risk segment 540, in order to determine how each of the individuals should be further segmented into one of the fourth level segments. Thus, although the default/bankruptcy profile model is developed using only individuals that are associated with a previous default account and/or bankruptcy, the model may be useful in segmenting individuals that are not associated with default accounts or bankruptcy.

FIG. 7 illustrates one embodiment of the segmentation structure of FIG. 6 having first through fifth level segments. In the embodiment of FIG. 7, the bankruptcy segment 650 is further subdivided into higher risk segment 710 and lower risk segment 720. In one embodiment, assignment of individuals to either the higher risk segment 710 or the lower risk segment 720 is determined according to preliminary risk scores for respective individuals. In other embodiments, other criteria may be used to segment individuals into the higher risk segment 710 or the lower risk segment 720.

Figure 8:
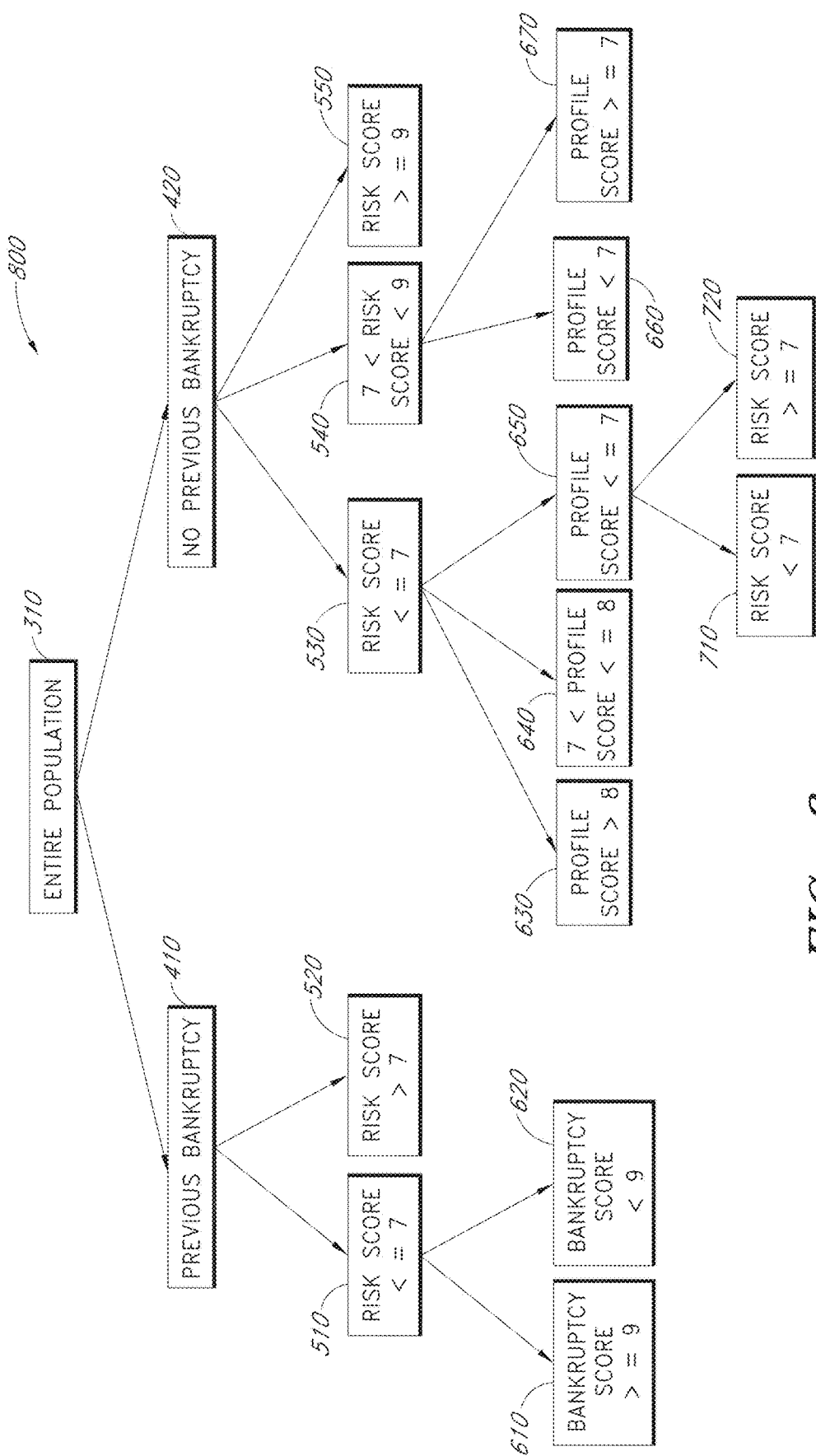
FIG. 8 illustrates one embodiment of the segmentation structure of FIG. 7 replacing the segment captions with criteria for assigning individuals to each segment.

FIG. 8 illustrates one embodiment of the segmentation structure of FIG. 7 replacing the segment captions with criteria for assigning individuals to each segment. Accordingly, the segmentation structure 700 may be used to assign an individual to a particular segment in the segmentation structure, based on various attributes of accounts held by the individual at the time of observation or application of the model. The criteria include in FIG. 8 are exemplary and are not intended to limit the types or ranges of criteria that may be used in segmenting individuals. In the embodiment of FIG. 8, the preliminary risk scores assigned to individuals range in values from 0 to 10, with 10 representing the least amount of risk; the default/bankruptcy scores range in values from 0 to 10, with 10 representing the greatest risk of default and 0 representing the greatest risk of bankruptcy; and the preliminary bankruptcy scores range in values from 0 to 10, with 10 representing the greatest risk of bankruptcy and 0 representing the least risk of bankruptcy. However, these ranges of values are exemplary and are not intended to limit the scope of the systems and methods described herein. Other scores, such as letter scores from A-F may be used as preliminary risk scores, default/bankruptcy scores, and/or preliminary bankruptcy scores. In other embodiments, higher values may represent different attributes of an individual than are described above. For example, in one embodiment, the preliminary bankruptcy scores may range in values from 0 to 10, with 0, rather than 10, representing the greatest risk of bankruptcy and 10, rather than 0, representing the least risk of bankruptcy.

In one embodiment, the final segment to which an individual is assigned is associated with a scoring model that is applied to the individual in order to develop a final risk score for the individual. Thus, the criteria included in each of the segments illustrated in FIG. 7 define which individuals should be associated with each particular segment, rather than indicating a particular final risk score associated with an individual. As described further below, certain scoring models associated with segments may adjust a final risk score for an individual due to assignment of the individual to a particular segment and/or assignment to a particular segment hierarchy. For example, in one embodiment a risk score model for higher bankruptcy risk segment 610 may inherently or explicitly adjust final risk scores of individuals in that segment based on the fact that the individuals are assigned to segment 610. In addition, the risk score model for segment 610 may also inherently or explicitly adjust the final risk scores of individuals in that segment based on the fact that the segment hierarchy includes higher risk segment 510 and previous bankruptcy segment 410. Other risk score models, however, may not adjust the final risk score based on assignment to particular segments or segment hierarchies, or may adjust for some, but not all, segments.

In the exemplary embodiment of FIG. 8, at the beginning of the segmentation process, all individuals are placed in the entire population segment 310. The individuals are then segmented into two groups, specifically, previous bankruptcy segment 410 and no previous bankruptcy segment 420. Thus, the determination of a second level segment is based only on whether the individual has previously filed for bankruptcy. As those of skill in the art will recognize, bankruptcy data may be obtained from various sources, such as public records or financial account information that may be available from one or more data sources.

Once an individual is segmented to either the previous bankruptcy segment 410 or the no previous bankruptcy segment 420, further segmentation according to preliminary risk scores is performed. As noted above, in one embodiment a preliminary risk score is determined for each of the individuals in the entire population segment 310. In the embodiment of FIG. 8, for those individuals assigned to the previous bankruptcy segment 410, if the preliminary risk score is less than or equal to seven, the account is assigned to the higher risk segment 510. If, however, an individual from the previous bankruptcy segment 410 has an associated preliminary risk score of greater than seven, the individual is assigned to the lower risk segment 520. Because the segmentation structure 800 does not include any further segments below the lower risk segment 520, a final risk model associated with the lower risk segment 520 may be applied to individuals assigned to segment 520 in order to generate respective final risk scores. However, segmentation structure 700 includes additional segments that are configured as child nodes of the higher risk segment 510 and, accordingly, the final risk score is not determined by a model associated with the higher risk segment 510, but rather by models associated with the child segments.

In the embodiment of FIG. 8, individuals in the higher risk segment 510 are further segmented based on a bankruptcy risk score. In one embodiment, a bankruptcy risk score is calculated for certain, or all, of the individuals in the previous bankruptcy segment 410. In the segmentation structure 700, individuals in the higher risk segment 510 with a bankruptcy risk score that is greater than or equal to nine are assigned to the higher bankruptcy risk segment 610, while individuals in the higher risk segment 510 with a bankruptcy score that is less than nine are assigned to the lower bankruptcy risk segment 620. In one embodiment, each of the higher bankruptcy risk segment 610 and lower bankruptcy risk segment 620 have respective final risk score models that are applied to the individuals assigned to the respective segments in order to determine a final risk score for each individual.

As shown in FIGS. 7 and 8, the previous bankruptcy segment 420 is linked to multiple child segments to which individuals may be segmented. In particular, individuals with a preliminary risk score of less than or equal to seven are assigned to the highest risk segment 530, individuals with a preliminary risk score of less than nine are assigned to the higher risk segment 540, and individuals with a preliminary risk score of greater than or equal to nine are assigned to the lower risk segment 550. Because the segmentation structure 800 does not include any further segments below the lower risk segment 550, a final risk model associated with the lower risk segment 550 is applied to individuals assigned to segment 550 in order to generate respective final risk scores. However, segmentation structure 800 includes additional segments that are configured as child nodes of the highest risk segment 530 and the higher risk segment 540 and, accordingly, the final risk score is not determined by a model associated with the highest risk segment 530 or the higher risk segment 510, but rather by models associated with the child segments.

In the embodiment of FIG. 8, the highest risk segment 530 includes multiple child nodes, specifically, default segment 630, default/bankruptcy segment 640, and bankruptcy segment 650. In one embodiment, individuals in the highest risk segment 530 are segmented into one of the segments 630, 640, or 650 based on a default/bankruptcy profile score. As described in further detail below with reference to FIGS. 9-14, a default/bankruptcy model may be developed based on account information related to individuals within either bankruptcy or default accounts within the outcome period. In one embodiment, individuals associated with default accounts includes those individuals that have had at least one 90 days past due account status in the outcome period. For example, in one embodiment an individual is categorized as default if within the two year outcome period, one or more accounts associated with the individual have reported a 90 days past due status. In one embodiment, the default category individuals and the bankruptcy category are mutually exclusive, so that if an individual satisfies the criteria for being categorized in both the bankruptcy and default categories, only the bankruptcy categorization will be applied to the individual. In other embodiments, other criteria may be used to categorize individuals as default or bankrupt. For example, information regarding 30 days past due, 60 days past due, and 120 days past due accounts of an individual may be used in categorizing individuals as default. Likewise, various time periods may be reviewed in order to locate possible past due accounts and bankruptcy information. For example, the outcome period may be six months, one year, two years, three years, or five years.

As will be described in further detail below, although the default/bankruptcy profile model is developed based on only account data associated with individuals categorized as either default or bankrupt, the default/bankruptcy profile model may advantageously be applied to individuals that are not categorized as either bankrupt or default in order to segment these individuals. For example, as illustrated in FIG. 8, those individuals in the highest risk segment 530 having a default/bankruptcy profile score of greater than 8 are assigned to the default segment 630, those individuals having a default/bankruptcy profile score of greater than seven, but less than or equal to eight, are assigned to the default/bankruptcy segment 640, and those individuals having a default/bankruptcy profile score of less than or equal to seven are assigned to the bankruptcy segment 650. In one embodiment, the assignment of individuals to one of the segments 630, 640, or 650, is indicative of a prediction as to whether the individual is more likely to either default or file for bankruptcy in the future. Thus, those individuals in the default segment 630 are more likely to default on an account in the future then they are to go bankrupt and those individuals in the bankruptcy segment 650 are more likely to declare bankruptcy in the future than to default on an account. In the embodiment of FIG. 8, those individuals in the default/bankruptcy segment 640 are substantially equally likely to either default on an account or to file for bankruptcy.

For those individuals in the higher risk segment 540, the default/bankruptcy profile model is applied and the individuals are further segmented to either the default segment 660 or the bankruptcy segment 670 according to the score returned from application of the default/bankruptcy profile model. More particularly, those individuals with a default/bankruptcy profile score of less than seven are assigned to the default segment 660, while those individuals with a default/bankruptcy profile score of greater than or equal to seven are assigned to the bankruptcy segment 670. As noted above, assignment to the default segment 660 may indicate that an individual is more likely to default on an account than to file for bankruptcy, while assignment to the bankruptcy segment 670 may indicate that an individual is more likely to file for bankruptcy then you default on an account.

Figure 8A:
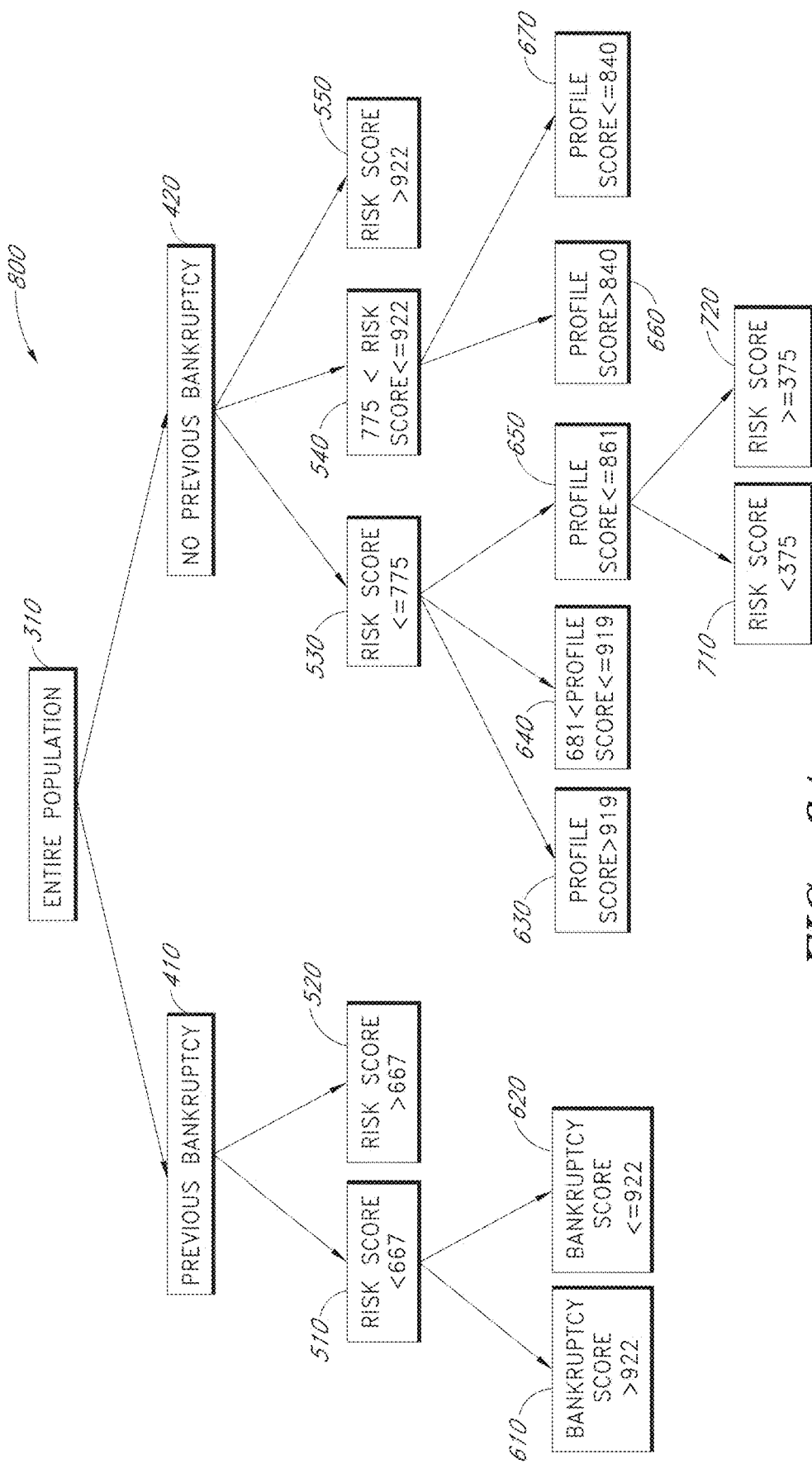
FIG. 8A illustrates another embodiment of the segmentation structure of FIG. 7 replacing the segment captions with criteria for assigning individuals to each segment.

In the embodiment of FIGS. 7 and 8, individuals assigned to the bankruptcy segment 650 may further be segmented into the higher risk segment 710 or the lower risk segment 720. In the embodiment of FIG. 8, segmentation to one of segments 710 or 720 is based upon the preliminary risk score for each individual. In the particular example of FIG. 8, those individuals having a preliminary risk score of less than seven are assigned to the higher risk segment 710, while those individuals having a preliminary risk score greater than or equal to seven are assigned to the lower risk segment 720. In one embodiment, each of the higher risk segment 710 and lower risk segment 720 are associated with a final risk score model that is applied to individuals within the respective segments in order to determine final risk scores for those individuals. FIG. 8A illustrates an additional embodiment of the segmentation structure of FIG. 7.

Figure 9:
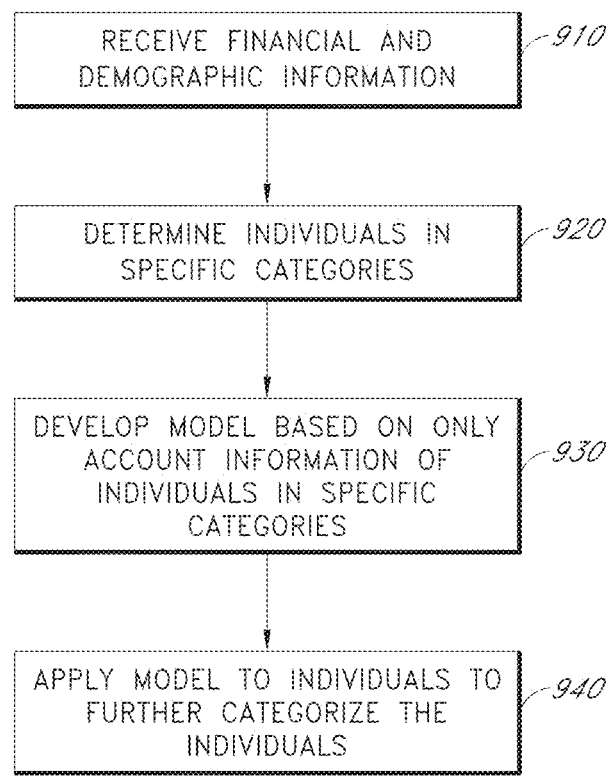
FIG. 9 is one embodiment of a flowchart illustrating an exemplary process for development of a model using financial and/or demographic information related to a subset of individuals, and application of the developed model to any individual.

FIG. 9 is one embodiment of a flowchart illustrating an exemplary process for development of a model using account information related to a subset of individuals (for example, individuals fitting a bad performance definition) and application of the developed model to any individual (for example, any individuals). This exemplary method of developing and applying a model may be stored as a process accessible by the profile module 120 and/or other components of the computing system 100. This process of generating and applying a model may be used in conjunction with various types of information. In one embodiment, models may be developed using the methodology described with reference to exemplary FIG. 9 based on data associated with two failure groups within a group of individuals fitting a bad performance definition. This model may then be applied to individuals that do not fit the bad performance definition, as well as to individuals that do fit the bad performance definition. For example, a first failure group may include individuals that have defaulted on installment loans and a second failure group may include individuals that have defaulted on revolving loans, where both failure groups fit a bad performance definition. In another embodiment, models may be developed with the methodology of FIG. 9 using information regarding the bank loans of individuals and information regarding auto loans of individuals. Depending on the embodiment, certain of the blocks described below may be removed, others may be added, and the sequence of the blocks may be altered.

In a block 910, financial and demographic information from a previous point in time, referred to as an observation point, regarding a plurality of individuals is received by a computing device, such as the computing system 100. This information may be obtained from various sources and received in various manners. In one embodiment, information may be received by the computing system 100 on a network connection with one or more financial data sources 162 and/or demographic data sources 166. In another embodiment, the financial and demographic information is retrieved by the computing system 100, such as, for example, by reading data stored on a data source connected to the network 160. In other embodiments, information may be received on a printed medium, such as through the mail, or verbally. In an advantageous embodiment, any information that is not received in an electronic format is converted to electronic format and made accessible to the computing system 100.

Next, in a block 920, behaviors of a subpopulation of individuals are observed over a set time period subsequent and mutually exclusive to the observation point. Individuals in two subcategories of a bad performance definition, such as first and second failure groups, are then selected for analysis in developing a model. For example, individuals having accounts that satisfy either default or bankruptcy criteria may be selected for use in developing a default/bankruptcy model. In another example, a first failure group may include individuals that have defaulted on an installment loan and a second failure group may include individuals that have defaulted on a revolving loan. The model generated using these failure groups may be used to determine whether an individual to which the generated model is applied is more likely to default on an installment loan or a revolving load. Additionally, models may be generated based on contrasting of data regarding individuals in other groups that are not necessarily part of a bad performance definition. Thus, the term failure group should not be construed as limited to only groups of individuals that have negative credit attributes. For example, a model may be created using information related to individuals in each of two success groups that are each part of a good performance definition. This model may then be used to determine the likelihood that an individual not fitting the good performance definition will enter the first success group or the second success group.

In a block 930, a model is developed based on only account information of the individuals in the selected one or more categories. Thus, the model is developed using account information related to only a subset of individuals, such as individuals in first and second failure groups within a bad performance definition. For example, a default/bankruptcy model may be developed using data associated with only those individuals having accounts that are classified as either bankrupt or default, although the entire population includes many other individuals that do not meet these criteria.

In a block 940, the developed model is applied to individuals using current data in order to segment individuals into groups, where each group includes individuals having one or more related attributes. In one embodiment, the developed model is applied to individuals that do not meet the criteria for the selected categories that were used in developing the model, such as individuals that fit a good performance definition. Thus, a default/bankruptcy model may be applied to individuals that are classified as neither default nor having a previous bankruptcy.

Figure 10:
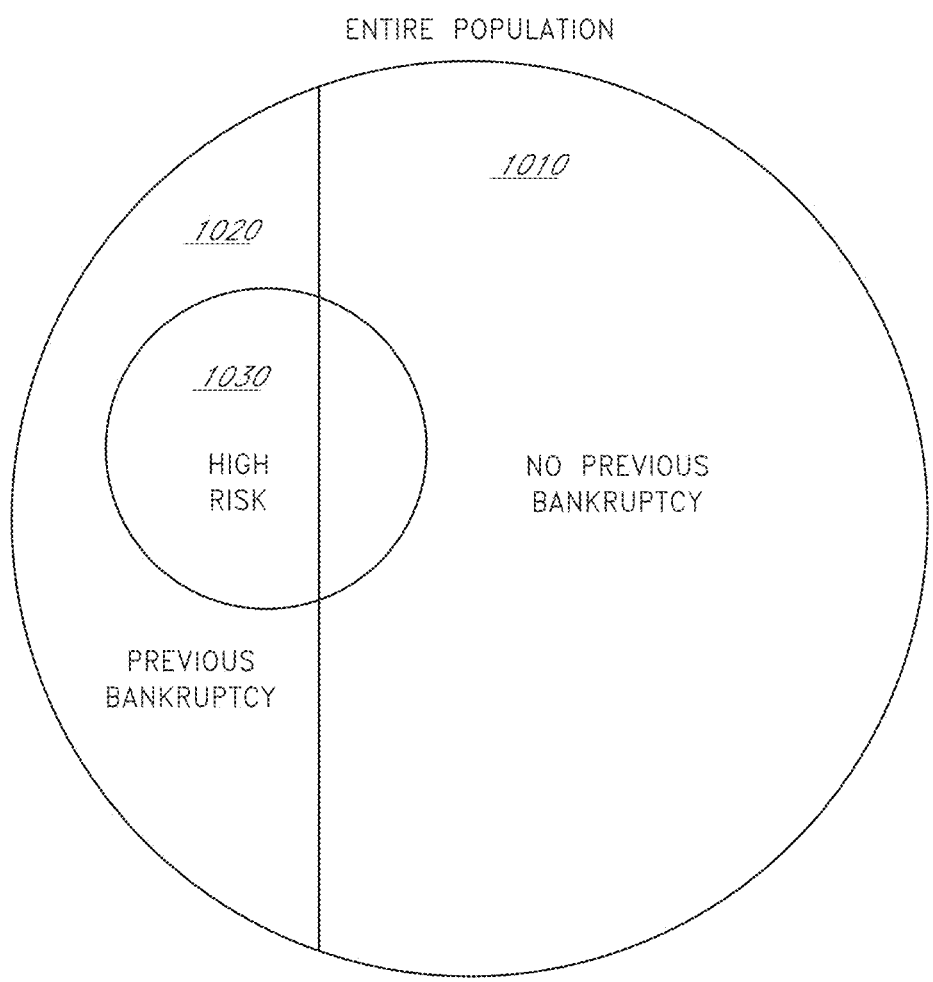
FIG. 10 is one embodiment of a Venn diagram showing an exemplary division of an entire population into previous bankruptcy and no previous bankruptcy segments, as well as a high risk segment that overlaps portions of both the previous bankruptcy and no previous bankruptcy segments.

FIG. 10 is one embodiment of a Venn diagram showing an exemplary division of an entire population into previous bankruptcy and no previous bankruptcy segments, as well as a high risk segment. As shown in FIG. 10, the entire population includes individuals with no previous bankruptcy in segment 1010, and those with a previous bankruptcy in segment 1020. Additionally, a high risk segment 1030 includes some individuals from both the previous bankruptcy segment 1020 and the no previous bankruptcy segment 1010. Thus, because there are high risk individuals in both the previous bankruptcy and no previous bankruptcy segments, a model developed using the high risk individuals and previous bankruptcy individuals may provide some predictive value to those individuals in the no previous bankruptcy segment 1010.

Figure 11:
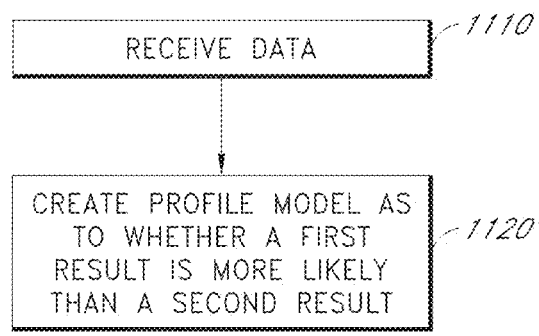
FIG. 11 is one embodiment of a flowchart showing a process of generating a model that tracks which of two or more results is most likely.

FIG. 11 is one embodiment of a flowchart showing a generic process of generating a profile model that tracks which of two or more results is more likely. The method of FIG. 11 may be applied to various types of data sets in order to predict which of two or more possible results is most likely. For example, the methodology of FIG. 11 may be used in order to generate a model that predicts whether an individual is more likely to default on a revolving loan or if the individual is more likely to default on an installation loan. This exemplary method of generating a profile model may be stored as a process accessible by the profile module 120 and/or other components of the computing system 100. Depending on the embodiment, certain of the blocks described below may be removed, others may be added, and the sequence of the blocks may be altered.

Beginning in a block 1110, data related to accounts that are associated with one or more of the results is received. For example, if the model is intended to determine if an individual is more likely to default on installment loans or revolving loans, the data received by a computing device 100 may include financial and demographic information regarding individuals that have previously defaulted on either installment or revolving loans. Likewise, if the model is intended to determine if an individual is more likely to default on a bank loan or if the individual is more likely to default on an automobile loan, the data received by the computing device 100 may include financial and demographic information regarding individuals that have previously defaulted on either automobile or bank loans.

Continuing to a block 1120, a model that predicts whether a first result is more likely that a second result is developed based on at least a portion of the received data. In one embodiment, the data related to the multiple results is analyzed in order to detect similarities and differences in the data. Application of one or more statistical models may be used in order to analyze the data and generate a model that projects which of the multiple results is more likely based upon attributes of an individual that are later evaluated using the developed model.

Figure 12:
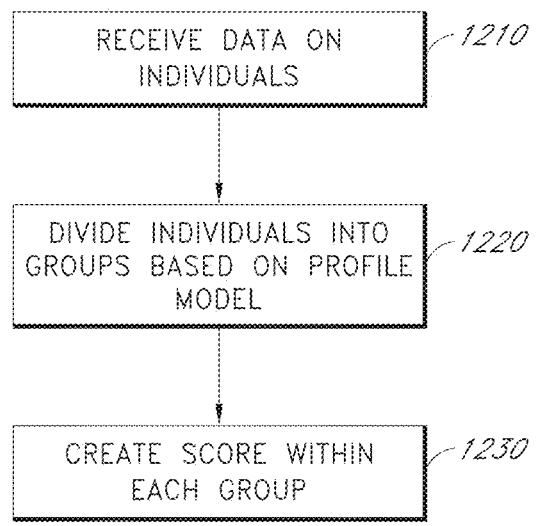
FIG. 12 is one embodiment of a flowchart showing a process of applying the model generated by the method of FIG. 11 in order to assign particular individuals to segments, where each segment may have a unique scoring model that is applied to accounts assigned to the segment.

FIG. 12 is one embodiment of a flowchart illustrating an exemplary process of applying the model generated by the method of FIG. 11 in order to assign particular individuals to segments, where each segment may have a unique scoring model that is applied to individuals assigned to that segment. This exemplary method of applying a model may be stored as a process accessible by the profile module 120 and/or other components of the computing system 100. As noted above with reference to FIGS. 3-8, segmentation of individuals into two or more segments may be useful to group individuals having one or more similar attributes, where a scoring model developed specifically for individuals having the similar attributes may be applied to individuals assigned to respective segments. Depending on the embodiment, certain of the blocks described below may be removed, others may be added, and the sequence of the blocks may be altered.

Beginning in a block 1210, data related to individuals to be scored is received. In one embodiment, the data received in block 1210 comprises financial and demographic information regarding one or more accounts related to each individual to be segmented. In other embodiments, the data regarding the individuals may comprise any other types of data that may be useful in categorizing the individuals into groups.

Continuing to a block 1220, individuals are divided into groups based on a model developed using a process similar to the process described above with reference to FIG. 11. For example, if the developed model predicts whether in individual is more likely to default on a revolving loan or a installment loan, the model may be applied to each of the individuals for which data is received in block 1210 in order to categories each of the individuals into a revolving loan group or an installment loan group. In one embodiment, the individuals that are classified using the model are not necessarily individuals that meet the criteria used for selected individuals for generation of the model. For example, a revolving/installment default model may be applied to individuals that have never defaulted on either a revolving loan or an installment loan in order to categorize the individual as either more likely to default on a revolving loan or more likely to default on and installment loan. In the embodiment of FIG. 8, for example, the default/bankruptcy model is applied to individuals in order to segment the individuals into multiple groups. In the embodiment of FIG. 8, the individuals that are categorized by the default/bankruptcy model have not previously declared bankruptcy and may not be in the default category either. Thus, the individuals on which the model is applied are not necessarily individuals that satisfy the criteria for use in model generation.

Moving to a block 1230, a score is created for each individual. In one embodiment, the scores for each individual are created based on a model that is specific to a particular segment in which the individual has been assigned. For example, if an individual is assigned to a first segment, such as through the use of a revolving/installment model score for the individual, a first scoring model may be applied to the individual in order to generate a final risk score for the individual. Likewise, if another individual is assigned to a second segment, such as through the use of the revolving/installment model score for the individual, a second scoring model may be applied to the individual in order to generate a final risk score.

Figure 13:
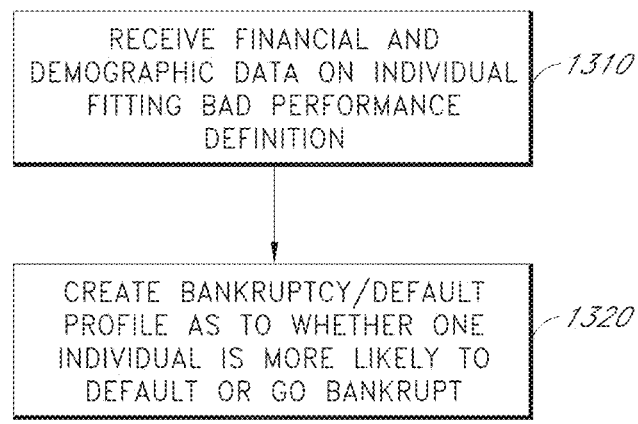
FIG. 13 is one embodiment of a flowchart showing a process of developing a default/bankruptcy profile model using only data related to individuals with accounts that are classified as default and individuals that have previously declared bankruptcy.

FIG. 13 is one embodiment of a flowchart showing a process of developing a profile model using only data regarding individuals with accounts that are classified as default and individuals that have previously declared bankruptcy. This exemplary method of developing a profile model may be stored as a process accessible by the profile module 120 and/or other components of the computing system 100. In an exemplary embodiment, the profile model uses data regarding individuals that fit a bad performance definition as measured in the outcome period in order to generate a default/bankruptcy profile model. Depending on the embodiment, certain of the blocks described below may be removed, others may be added, and the sequence of the blocks may be altered.

Beginning in a block 1310, financial and demographic data regarding individuals with default accounts and individuals that have previously filed for bankruptcy during the outcome period are received by a computing device, such as the computing system 100. As noted above, individuals may fit a bad performance definition based on various criteria, such as a number of past due accounts and a past due period for those accounts. In the embodiment described herein, individuals fit a bad performance definition if an account associated with an individual has had a 90+ day past-due status or if the individual has filed for bankruptcy within the two year outcome period.

Moving to a block 1320, a default/bankruptcy profile model as to whether an individual is more likely to default or go bankrupt is developed. The model developed by the computing system 100 in block 1320 may be applied to individuals in order to predict whether an individual is more likely to file for bankruptcy or to have a default account. In one embodiment, the model may also predict that there is a similar likelihood that the individual either declares bankruptcy or as a default account.

Figure 14:
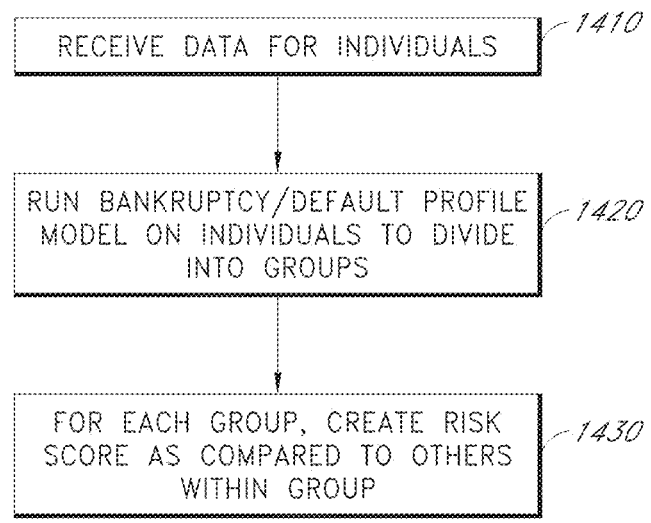
FIG. 14 is one embodiment of a flowchart showing a process of applying the default/bankruptcy profile model generated by the method of FIG. 13 in order to segment individuals.

FIG. 14 is one embodiment of a flowchart showing a process of applying the default/bankruptcy profile model to individuals. As noted above, the default/bankruptcy profile model may be applied to any individuals, regardless of whether the individuals have associated default accounts or have filed for bankruptcy. This exemplary method of applying a default/bankruptcy profile model may be stored as a process accessible by the profile module 120 and/or other components of the computing system 100. Depending on the embodiment, certain of the blocks described below may be removed, others may be added, and the sequence of the blocks may be altered.

In a block 1410, data regarding individuals to be segmented is received by the computing system 100. The received data may be received from one or more data sources, such as the financial data source 162 and the demographic data source 166.

Moving to a block 1420, the default/bankruptcy profile model is applied to individuals for which current data has been received in order to segment the individuals into two or more segments. For example, with reference to FIGS. 7 and 8, a default/bankruptcy profile model is applied to individuals in the highest risk segment 530 in order to further segment the individuals into default segment 630, default/bankruptcy segments exported, or bankruptcy segments 650. Likewise, the default/bankruptcy profile model is applied to individuals assigned to the higher risk segment 540 in order to further segment those individuals into either the default segment 660 or the bankruptcy segment 670. In this embodiment, the default/bankruptcy profile model is used only for segmenting the individuals and not specifically in the determination of a final risk score for the individuals. In other embodiments, the results of application of the default/bankruptcy profile model may be used in the development of risk scores for individuals.

Continuing to a block 1430, final risk scores are generated for the segmented individuals according to a risk score model that is particular to the segment in which each individual is assigned. For example, if an individual is assigned to the default segment 630, a risk score model that has been developed specifically for scoring those individuals that have a higher risk of defaulting, rather than going bankrupt, is applied to the individual. If an individual is assigned to the bankruptcy segment 670, a risk score model that has been developed specifically for scoring those individuals that have a higher risk of filing for bankruptcy, rather than defaulting, is applied to the individual. Thus, for each bottom segment of the segmentation structure 700, a separate risk score model may be developed and applied to individuals that are assigned to the respective segments. For example, in the embodiment of FIG. 7, the bottom segments include the higher bankruptcy risk segment 610, the lower bankruptcy risk segment 620, the lower risk segment 520, the default segment 630, the default/bankruptcy segment 640, the higher risk segment 710, the lower risk segment 720, the default segment 660, and the bankruptcy segment 670. Thus, each of these segments may include a unique risk scoring model that is applied to individuals within each respective segment. In other embodiments, a risk scoring model may be used by multiple segments in determining final risk scores.

II. Adverse Action Codes

Figure 15:
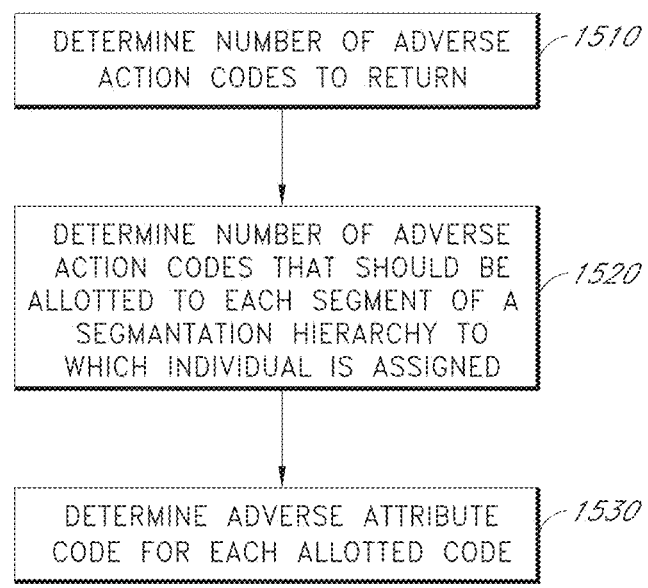
FIG. 15 is one embodiment of a flowchart illustrating an exemplary method of allocating adverse action codes to various levels of a segment hierarchy associated with an individual.

FIG. 15 is one embodiment of a flowchart illustrating an exemplary method of allocating adverse action codes to various levels of a segment hierarchy associated with an individual. In certain embodiments, after determining a segment hierarchy for an individual, a final risk score is returned and may be provided to a customer, such as the customer 164. In certain embodiments, the customer may request and/or be provided with information regarding attributes of or other information about the individual that contributed to any decreases in the final risk score. For example, if a total risk score range that may be assigned to individuals is from 0 to 100, with 100 representing the lowest risk and 0 representing the highest risk, various factors may contribute to the actual final risk score assigned to each individual. For example, the segment to which an individual is assigned may be considered in determining the final risk score. In addition, the segment hierarchy, or the parent segments to the assigned segment, may also be considered and may affect the final risk score for the individual. Thus, the risk scoring model used by the assigned segment may take into account the assigned segment and the segment hierarchy in determining a final risk score.

Figure 16:
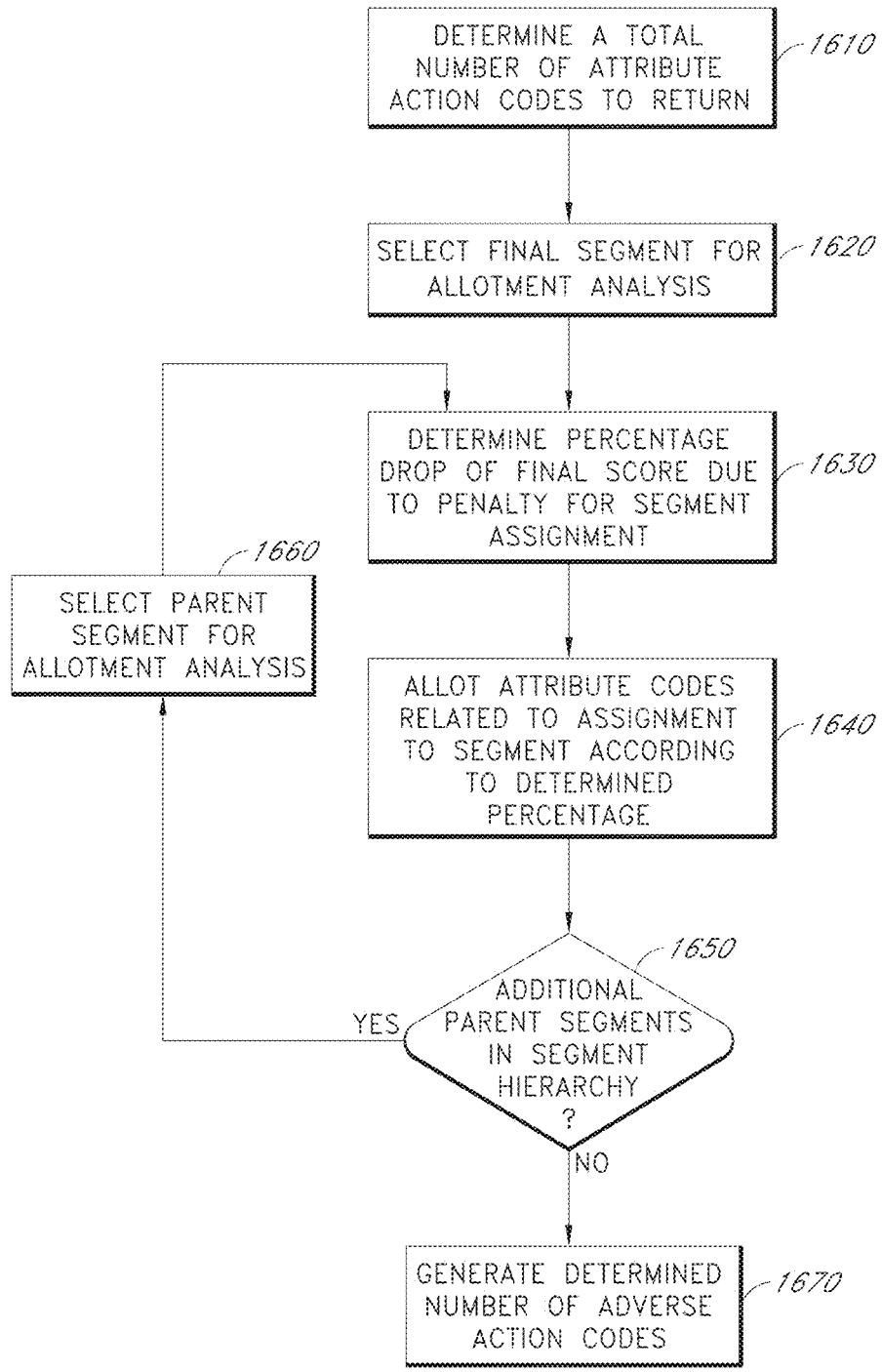
FIG. 16 is one embodiment of a flowchart illustrating an exemplary process of determining how many adverse action codes should be allotted to each level of the segment hierarchy of an individual.
Figure 17:
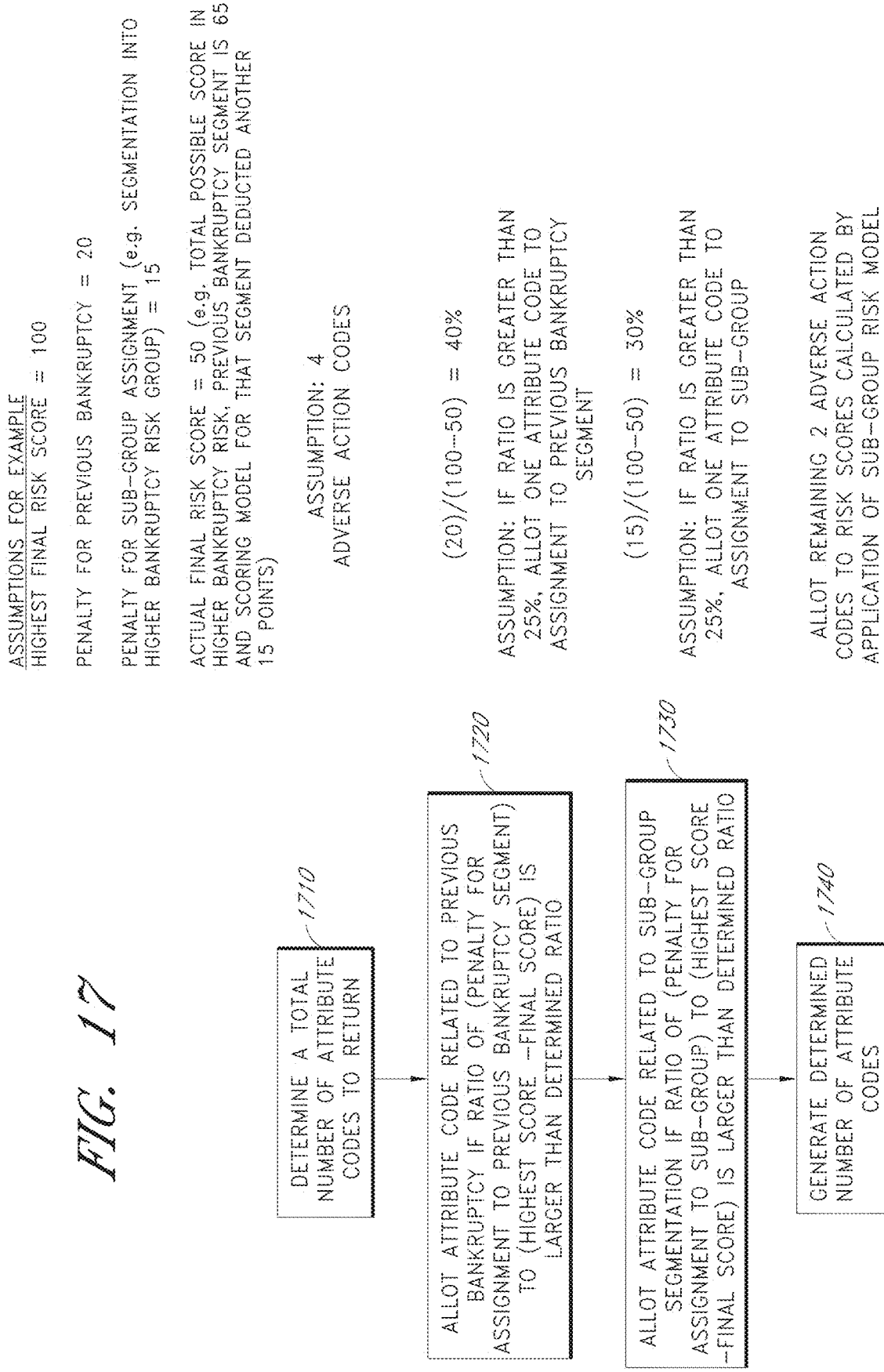
FIG. 17 is one embodiment of a flowchart illustrating an exemplary process of allocating adverse action codes to various segments in a segment hierarchy.

In one embodiment, indicators of adverse action codes are provided to the customer, where the adverse action codes indicate a specific reason as to why a final risk score for an individual is less than the maximum. In certain embodiments, adverse action code may indicate that a final risk score is less than the maximum partly because of the segment, or segment hierarchy, to which the individual was assigned. However, for different individuals, the actual affect of being assigned in a particular segment or in a segment hierarchy on the final risk score may be significantly different. For example, for a first individual, assignment to lower bankruptcy risk segment 620 (FIG. 7) may have had a larger percentage impact on the individuals final risk score than for a second individual that was also assigned to the lower bankruptcy risk segment 620. Thus, providing an adverse action code related to segmentation of the first individual may be appropriate, while providing an adverse action code related to segmentation of the second individual may not provide the most relevant information to the customer regarding reasons for the final risk score for the individual. Accordingly, described herein with respect to FIGS. 15-17 are exemplary methods of allotting adverse action codes related to segmentation of an individual based on the relevance of the segmentation decision on the final risk score assigned to the individual. Depending on the embodiment, certain of the blocks described below may be removed, others may be added, and the sequence of the blocks may be altered.

Beginning in a block 1510, a number of adverse action codes to be provided to the customer 164, for example, is determined. In one embodiment, a predetermined number of adverse action codes, such as 2, 4, 5, 6, 8, or 10 adverse action codes, are returned for each individual for which a final risk score is developed. In one embodiment, the number of adverse action codes is determined or calculated based on attributes of the particular individual being scored and/or the final risk score, and/or other characteristics related to scoring of the individual.

Continuing to a block 1520, the number of adverse action codes that should be allotted to each level of a segmentation structure in which the individual is assigned is determined. For example, one or more adverse action codes may be returned for the segment in which an individual is assigned, as well as for each of the parent segments in the segment hierarchy. The allotment of adverse action codes for various levels of a segmentation hierarchy may be determined based on several factors, such as the relative impact of assignments to each level of the segment hierarchy had on the final risk score for the individual.

Moving to a block 1530, the adverse action codes for each allotted segment are determined. In one embodiment, the adverse action code for being assigned to a particular segment comprises an indication that the individual was assigned to the particular segment. For example, an adverse action code for an individual assigned to the higher bankruptcy risk segment 610 (FIG. 7) may indicate that the individual was assigned to the higher bankruptcy risk segment. Additionally, the individual assigned to the higher bankruptcy risk segment 610 may also receive an adverse action code indicating that the individual was assigned to a higher risk segment, for example, the higher risk segment 510. However, based on the allotment of adverse action codes, neither of these segmentation adverse action codes may be reported to the customer, and all of the adverse action codes may be related to the various outputs of the scoring model associated with generation of the final risk score.

FIG. 16 is one embodiment of a flowchart illustrating an exemplary process of determining how many adverse action codes should be allotted to each level of the segment hierarchy to which an individual has been assigned.

Beginning in a block 1610, the total number of adverse action codes to provide to the customer is determined. As noted above, the number of adverse action codes returned may be a static number used for all individuals or, alternatively, may be a dynamic number that is determined based on attributes of the individual or results of one or more scoring models applied to the individual.

Continuing to a block 1620, the final segment to which the individual was assigned is selected for allotment analysis. More particularly, the segment in which the individual was assigned is selected in order to determine whether one or more of the available adverse action codes should indicate assignment to the segment.

Moving to a block 1630, a percentage drop of the final risk score for the individual due to a penalty for assignment to the selected segment is determined. In certain embodiments, assignment to a particular segment decreases a total possible final risk score that an individual may receive. For example, if a total possible final risk score for the entire population 310 (FIG. 700) is 1000, the total possible final risk score for individuals in the previous bankruptcy segment 410 may be decreased, for example by 100 points, so that the total possible final risk score for individuals segmented in the previous bankruptcy segment 410 is 900. Similarly, if an individual is then further segmented into the higher risk segment 510, the total possible final risk score for the individual may be further decreased by another penalty, for example 50 points, reducing the total possible final risk score for individuals segmented in the higher risk segment 510 to 850.

Continuing to a block 1640, the selected segment is allotted one or more adverse action codes if the percentage drop of the final risk score due to a penalty for assignment to the selected segment is within a predetermined range. For example, in one embodiment a single adverse action code may be allotted to the selected segment if the percentage drop of the final risk score due to the penalty for assignment to the selected segment is greater than 25%. In other embodiments, the percentage drop required for allocating an adverse action code to a particular segment may be lower or higher than 25%, such as 10%, 12.5%, 20%, 30%, or 50%, for example.

Moving to a decision block 1650, the computing system 100 determines if there are additional parent groups in the segmentation hierarchy to which the individual has been assigned. For example, the segmentation hierarchy for an individual assigned to the higher bankruptcy risk segment 610 includes the higher risk segment 510, the previous bankruptcy segment 410, and the entire population segment 310. Accordingly, after allotment of adverse action codes to the higher bankruptcy risk segment 610, the computing device 100 determines at block 1650 that additional parent groups in the segment hierarchy are present and additional adverse action code allotment should be considered. If additional parent groups are present, the process continues to a block 1660 where the parent group of the previously selected segment is selected for allotment analysis. For example, after allotment analysis on the higher bankruptcy risk group 610, the higher risk segment 510 is selected at block 1660 for allotment analysis. Likewise, after allotment analysis on higher risk segment 510, the previous bankruptcy segment 410 is selected for allotment analysis. After selecting the parent group for allotment analysis in block 1660, the method continues to block 1630, 1640, and 1650. Thus, the process of determining a percentage drop of the final risk score due to a penalty for assignment to a particular segment and allotment of adverse action codes based on the determined percentage may be performed for each segment in the segmentation hierarchy for the individual. After each of the segments in the segmentation hierarchy are considered for allotment analysis, the method continues from block 1650 to a block 1670, where the adverse action codes allotted to various segments are generated and provided to the customer.

Although the embodiment of FIG. 16 begins the process of allocating adverse action codes at the final segment to which the individual is assigned and moves upward through the segmentation hierarchy, it is understood that the process of allocating adverse action codes to segments may be performed in the opposite direction, or in any other order. In one embodiment, adverse action code allotment begins at the first segmentation level, with the entire population segment 310 (FIG. 7), for example, and then moves to the children nodes, such as to the previous bankruptcy segment 410, then to the higher risk segment 510, and then to the higher bankruptcy risk segment 610. In other embodiments, not all of the segments in a segmentation structure are considered for allotment of adverse action codes. For example, the entire population segment 310 and the no previous bankruptcy segment 420, among other segments, may be excluded from adverse action code allotment analysis, such as by using the process described above with reference to FIG. 16.

FIG. 17 is one embodiment of a flowchart illustrating an exemplary process of allocating adverse action codes to various segments in a segment hierarchy. FIG. 17 also includes an example of application of the general formulas described in the flowchart using exemplary data related to an exemplary individual. In the example illustrated in FIG. 17, it is assumed that the highest final risk score possible for an individual is 100, the penalty for being assigned to the previous bankruptcy segment 410 (FIG. 7) is 20, and the penalty for assignment to the higher bankruptcy risk segment 610 is 15. Thus, in the example discussed with reference to FIG. 17, for an individual assigned to the higher bankruptcy risk segment 610, the total possible final risk score is 65. For purposes of example, an individual assigned to the higher bankruptcy risk segment 610 and having a final score of 50, for example, having 15 points deducted for reasons other than being assigned to the higher bankruptcy risk segment 610, is discussed with reference to the adverse action code allotment method.

In a block 1710, a total number of adverse action codes to provide to the customer is determined. In the example of FIG. 17, 4 adverse action codes are returned to the customer.

Continuing to a block 1720, an adverse action code related to being assigned to the previous bankruptcy segment is allotted if the ratio of the penalty for assignment to the previous bankruptcy segment to the difference between the highest available final risk score and the actual final risk score is larger than a predetermined ratio. In the example of FIG. 70, the penalty for assignment to the previous bankruptcy segment is 20 and the difference between the highest final risk score and the actual final risk score is 50 (for example, 100−50=50). Thus, the determined ratio is 40%. In this example, one adverse action code is allotted to indicate segmentation to the previous bankruptcy segment if the ratio is greater than 12.5%. Because the determined ratio of 40% is greater than 12.5%, an adverse action code is assigned to indicate segmentation to the previous bankruptcy segment. In one embodiment, this allotted adverse action code returned to the customer indicates that the individual was assigned to a previous bankruptcy group and assignment to that segment had a nontrivial effect on the actual final risk score of the individual.

Moving to a block 1730, an adverse action code related to being assigned to a subgroup, or segment configured as a child of the previous bankruptcy segment, is allotted if the ratio of the penalty for assignment to the particular subgroup to the difference in the highest available final risk score and the actual final risk score is larger than a predetermined ratio.

In the example of FIG. 17, the penalty for assignment to the higher bankruptcy risk segment 610 is 15 and a difference between the highest final risk score and the actual final risk score is 50 (for example, 100−50=50). Accordingly, the determined ratio is 30%. In this example, if the ratio is between 12.5% and 37.5%, one adverse action code is allotted to indicate segmentation to the subgroup; and if the ratio is greater than 37.5%, two adverse action codes are allotted to indicate segmentation to the subgroup. Using the exemplary figures provided herein, the ratio is 30% and, thus, one adverse action code is allotted for indicating segmentation to the higher bankruptcy risk segment 610.

Next, in a block 1740, the allotted adverse action codes are determined and returned to the customer. Using the exemplary figures introduced with respect to FIG. 17, one adverse action code has been allotted for indication of assignment to the previous bankruptcy segment and one adverse action code has been allotted to indicate segmentation to a subgroup, such as the higher bankruptcy risk segment 610. In one embodiment, the reported adverse action codes are derived from the characteristic that had the most negative impact on segmentation to the selected segment. Accordingly, because the total number of adverse action codes to return to the customer is four in this example, two adverse action codes may be allotted to indicate relevant information determined from the segment scoring model applied to the individual. In other examples, a different range of risk score may be used. For example, the highest final risk score may be 990 with the minimum score at 501; the penalty for a previous bankruptcy may be 190 such that the highest score for an individual with a previous bankruptcy is 800; the penalty for being in the highest bankruptcy risk is 160 such that the highest score for an individual with the highest bankruptcy risk is 550.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A non-transitory computer readable medium storing computer executable instructions that, when executed by one or more computer systems, configure the one or more computer systems to segment a plurality of individuals into one of a plurality of segments of a segmentation structure by performing operations comprising:

retrieving, from an electronic data store, information defining a bad performance definition, wherein the bad performance definition is defined to include individuals that have characteristics of at least one of a first failure mode of having defaulted on a financial instrument or a second failure mode of having declared bankruptcy;

obtaining first data comprising financial and demographic information regarding a plurality of individuals fitting the bad performance definition, the first data indicating characteristics of the individuals at an observation point in time;

obtaining second data comprising financial and demographic information regarding the plurality of individuals fitting the bad performance definition, the second data indicating behaviors of the individuals fitting the bad performance definition during an outcome period, the outcome period beginning after the observation point in time, the behaviors measured for the individuals fitting the bad performance definition during the outcome period include repayment performance, bankruptcy filing and response to a marketing offer;

based on both (a) the first data indicating the characteristics of the individuals at the observation point in time and (b) the second data indicating the behaviors of the individuals during the outcome period, generating a segmentation model configured to determine whether an individual not fitting the bad performance definition is more likely to enter the first failure mode or the second failure mode;

applying the segmentation model to at least a first portion of data associated with a first individual not fitting the bad performance definition, the first portion of the data comprising financial and demographic information of the first individual;

based on a first determination that an output of the segmentation model indicates that the first individual is more likely to enter the first failure mode than the second failure mode:
 assigning the first individual to a first segment of a segmentation structure, the first segment comprising a first risk score model;
 applying the first risk score model to the data associated with the first individual to determine a first risk score for the first individual;
 allotting one or more first adverse action codes to the first individual based on relevance of the first determination on the first risk score for the first individual;
 providing via a graphical user interface the first risk score to the first individual;
 receiving, via the graphical user interface and responsive to the provided first risk score, a request for information that contributed to the provided first risk score; and
 providing, via the graphical user interface and responsive to the request, the one or more first adverse action codes to the first individual;

applying the segmentation model to at least a second portion of data associated with a second individual not fitting the bad performance definition, the second portion of the data comprising financial and demographic information of the second individual; and based on a second determination that the output of the segmentation model indicates that the second individual is more likely to enter the second failure mode than the first failure mode:
 assigning the second individual to a second segment of the segmentation structure, the second segment comprising a second risk score model, wherein the second segment is different than the first segment;
 applying the second risk score model to the data associated with the second individual to determine a second risk score for the second individual, wherein the second risk score model is different than the first risk score model; and
 allotting one or more second adverse action codes to the second individual based on relevance of the second determination on the second risk score for the second individual.

2. The non-transitory computer readable medium of claim 1, wherein the observation time comprises a plurality of months prior to generation of the model.

3. The non-transitory computer readable medium of claim 2, wherein the outcome period is a period approximating the plurality of months but excludes the observation time.

4. The non-transitory computer readable medium of claim 1, wherein the first segment is part of a segmentation structure comprising at least two hierarchical levels of segments.

5. The non-transitory computer readable medium of claim 4, wherein the operations further comprise assigning the first individual to a parent segment in the segmentation structure based at least in part on output of the model.

6. The non-transitory computer readable medium of claim 1, wherein the operations further comprise adjusting the first risk score based at least in part on the assignment of the first individual to the first segment.

7. The non-transitory computer readable medium of claim 6, wherein the operations further comprise adjusting the second risk score based at least in part on the assignment of the second individual to the second segment.

8. A computer-implemented method to segment a plurality of individuals into one of a plurality of segments of a segmentation structure, the method comprising:

retrieving, from an electronic data store, information defining a bad performance definition, wherein the bad performance definition is defined to include individuals that have characteristics of at least one of a first failure mode of having defaulted on a financial instrument or a second failure mode of having declared bankruptcy;

obtaining first data comprising financial and demographic information regarding a plurality of individuals fitting the bad performance definition, the first data indicating characteristics of the individuals at an observation point in time;

obtaining second data comprising financial and demographic information regarding the plurality of individuals fitting the bad performance definition, the second data indicating behaviors of the individuals fitting the bad performance definition during an outcome period, the outcome period beginning after the observation point in time, the behaviors measured for the individuals fitting the bad performance definition during the outcome period include repayment performance, bankruptcy filing and response to a marketing offer;

based on both (a) the first data indicating characteristics of the individuals at the point in observation time and (b) the second data indicating the behaviors of the individuals during the outcome period, generating a segmentation model configured to determine whether an individual not fitting the bad performance definition is more likely to enter the first failure mode or the second failure mode;

applying the segmentation model to at least a first portion of data associated with a first individual not fitting the bad performance definition, the first portion of the data comprising financial and demographic information of the first individual;

based on a first determination that an output of the segmentation model indicates that the first individual is more likely to enter the first failure mode than the second failure mode:
 assigning the first individual to a first segment of a segmentation structure, the first segment comprising a first risk score model;

applying the first risk score model to the data associated with the first individual to determine a first risk score for the first individual;
allotting one or more first adverse action codes to the first individual based on relevance of the first determination on the first risk score for the first individual;
providing via a graphical user interface the first risk score to the first individual;
receiving, via the graphical user interface and responsive to the provided first risk score, a request for information that contributed to the provided first risk score; and
providing, via the graphical user interface and responsive to the request, the one or more first adverse action codes to the first individual;
applying the segmentation model to at least a second portion of data associated with a second individual not fitting the bad performance definition, the second portion of the data comprising financial and demographic information of the second individual; and
based on a second determination that the output of the segmentation model indicates that the second individual is more likely to enter the second failure mode than the first failure mode:
assigning the second individual to a second segment of the segmentation structure, the second segment comprising a second risk score model, wherein the second segment is different than the first segment;
applying the second risk score model to the data associated with the second individual to determine a second risk score for the second individual, wherein the second risk score model is different than the first risk score model; and
allotting one or more second adverse action codes to the second individual based on relevance of the second determination on the second risk score for the second individual.

9. The computer-implemented method of claim 8, wherein the first segment is part of a segmentation structure comprising at least two hierarchical levels of segments.

10. The computer-implemented method of claim 9, further comprising assigning the first individual to a parent segment in the segmentation structure based at least in part on output of the model.

11. The computer-implemented method of claim 8, further comprising adjusting the first risk score based at least in part on the assignment of the first individual to the first segment.

12. The computer-implemented method of claim 8, wherein the first failure mode comprises filing for bankruptcy and the second failure mode comprises defaulting on a financial instrument.

13. The computer-implemented method of claim 8, wherein the first failure mode comprises defaulting on an installment loan and the second failure mode comprises defaulting on a revolving loan.

14. The computer-implemented method of claim 8, wherein the first failure mode comprises defaulting on a bank loan and the second failure mode comprises defaulting on an automobile loan.

15. A computer system to segment a plurality of individuals into one of a plurality of segments of a segmentation structure, the computer system comprising:
memory; and
a hardware processor in communication with the memory and configured with processor-executable instructions to perform operations comprising:
obtaining a bad performance definition, wherein the bad performance definition is defined to include individuals that have characteristics of at least one of a first failure mode of having defaulted on a financial instrument or a second failure mode of having declared bankruptcy;
obtaining first data comprising financial and demographic information regarding a plurality of individuals fitting the bad performance definition, the first data indicating characteristics of the individuals at an observation point in time;
obtaining second data comprising financial and demographic information regarding the plurality of individuals fitting the bad performance definition, the second data indicating behaviors of the individuals fitting the bad performance definition during an outcome period, the outcome period beginning after the observation point in time, the behaviors measured for the individuals fitting the bad performance definition during the outcome period include repayment performance, bankruptcy filing and response to a marketing offer;
based on both (a) the first data indicating the characteristics of the individuals at the observation point in time and (b) the second data indicating the behaviors of the individuals during the outcome period, generating a segmentation model configured to determine whether an individual not fitting the bad performance definition is more likely to enter the first failure mode or the second failure mode;
applying the segmentation model to at least a first portion of data associated with a first individual not fitting the bad performance definition, the first portion of the data comprising financial and demographic information of the first individual;
based on a first determination that an output of the segmentation model indicates that the first individual is more likely to enter the first failure mode than the second failure mode:
assigning the first individual to a first segment of a segmentation structure, the first segment comprising a first risk score model;
applying the first risk score model to the data associated with the first individual to determine a first risk score for the first individual;
allotting one or more first adverse action codes to the first individual based on relevance of the first determination on the first risk score for the first individual;
providing via a graphical user interface the first risk score to the first individual;
receiving, via the graphical user interface and responsive to the provided first risk score, a request for information that contributed to the provided first risk score; and
providing, via the graphical user interface and responsive to the request, the one or more first adverse action codes to the first individual;
applying the model to at least a second portion of data associated with a second individual not fitting the bad performance definition, the second portion of the data comprising financial and demographic information of the second individual; and
based on a second determination that the output of the segmentation model indicates that the second individual is more likely to enter the second failure mode than the first failure mode:

assigning the second individual to a second segment of the segmentation structure, the second segment comprising a second risk score model, wherein the second segment is different than the first segment;

applying the second risk score model to the data associated with the second individual to determine a second risk score for the second individual, wherein the second risk score model is different than the first risk score model; and allotting one or more second adverse action codes to the second individual based on relevance of the second determination on the second risk score for the second individual.

16. The computer system of claim 15, wherein the first data comprises demographic data and financial data regarding the plurality of individuals.

17. The computer system of claim 15, wherein the operations further comprise adjusting the first risk score based at least in part on the assignment of the first individual to the first segment.

18. The computer system of claim 15, wherein the operations further comprise assigning the first individual to a parent segment of the first segment in a segmentation structure based at least in part on output of the model.

* * * * *

UNITED STATES PATENT AND TRADEMARK OFFICE
CERTIFICATE OF CORRECTION

PATENT NO. : 11,157,997 B2
APPLICATION NO. : 15/962933
DATED : October 26, 2021
INVENTOR(S) : Chuck Robida Page 1 of 1

It is certified that error appears in the above-identified patent and that said Letters Patent is hereby corrected as shown below:

On the Title Page

Column 2, item (57), Line 13, delete "The" and insert --Thus, the--.

Page 4, Column 2, item (56), Line 4, delete "Lmrey" and insert --Imrey--.

Page 7, Column 1, item (56), Line 17, delete "Milne" and insert --Milne et al.--.

Page 11, Column 2, item (56), Line 12, delete "774 Jacob" and insert --Jacob--.

Page 12, Column 2, item (56), Line 15, delete "cnetcom" and insert --cnet.com--.

Page 14, Column 1, item (56), Line 25, delete "8(TransferBalance." and insert --&TransferBalance.--.

In the Drawings

Sheet 14 of 16, FIG. 15, reference numeral 1520, Line 4, delete "SEGMANTATION" and insert --SEGMENTATION--.

In the Specification

Column 7, Line 24, delete "160" and insert --160.--.

Column 21, Line 48, delete "70," and insert --17,--.

In the Claims

Column 24, Line 49, Claim 8, delete "individuals at the point in observation time" and insert --individuals at the observation point in time--.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*